United States Patent
Patel

(10) Patent No.: US 11,510,519 B2
(45) Date of Patent: Nov. 29, 2022

(54) STEEPING APPARATUS AND METHODS FOR BREWING A BEVERAGE

(71) Applicant: Abdul Ebrahim Patel, Essex (GB)

(72) Inventor: Abdul Ebrahim Patel, Essex (GB)

( * ) Notice: Subject to any disclaimer, the term of this patent is extended or adjusted under 35 U.S.C. 154(b) by 562 days.

(21) Appl. No.: 16/469,297

(22) PCT Filed: Nov. 22, 2017

(86) PCT No.: PCT/GB2017/053502
§ 371 (c)(1),
(2) Date: Jun. 13, 2019

(87) PCT Pub. No.: WO2018/109431
PCT Pub. Date: Jun. 21, 2018

(65) Prior Publication Data
US 2020/0029723 A1    Jan. 30, 2020

(30) Foreign Application Priority Data
Dec. 14, 2016 (GB) ...................................... 1621221

(51) Int. Cl.
*A47J 31/20* (2006.01)
*A23F 5/26* (2006.01)

(52) U.S. Cl.
CPC ................. *A47J 31/20* (2013.01); *A23F 5/26* (2013.01)

(58) Field of Classification Search
CPC ...................................... A47J 31/20; A23F 5/26
See application file for complete search history.

(56) References Cited

U.S. PATENT DOCUMENTS

| | | | |
|---|---|---|---|
| 1,143,239 A | 6/1915 | Talbutt et al. | |
| 2,936,696 A | 5/1960 | Sorlini | |
| 5,632,193 A | 5/1997 | Shen | |
| 6,038,963 A * | 3/2000 | Patterson | A47J 31/20 99/287 |
| 6,481,337 B1 | 11/2002 | Guu | |
| 2003/0070979 A1 | 4/2003 | Huang | |

(Continued)

FOREIGN PATENT DOCUMENTS

| | | |
|---|---|---|
| CN | 2995410 Y | 10/1998 |
| EP | 1447033 A1 | 8/2004 |

(Continued)

*Primary Examiner* — Omar Flores Sanchez
(74) *Attorney, Agent, or Firm* — Dickinson Wright PLLC

(57) ABSTRACT

A steeping apparatus (10) includes a container (12) and a partition (22) dividing the container into upper and lower chambers (24, 26). The partition has a central aperture (32, FIG. 2) which interconnects the chambers and is arranged to trap a volume of air 38 in the lower chamber when the container is filled with liquid. Hot water poured into the upper chamber (24) passes through the aperture to partially fill the lower chamber, trapping a volume of air (38). Brewing material (34) located in the upper chamber (24) steeps in the hot water to produce a beverage and gradually sinks into the lower chamber (26) through the aperture. The air (38) trapped in the lower chamber applies a force to the liquid inhibiting movement of liquid between the chambers so that the brewing material (34) is isolated from the beverage. In other embodiments, the partition is pressed down through the container after brewing to isolate the brewing material.

22 Claims, 30 Drawing Sheets

(56) References Cited

U.S. PATENT DOCUMENTS

| | | | |
|---|---|---|---|
| 2004/0154471 A1* | 8/2004 | Tardif | A47J 31/20 |
| | | | 99/279 |
| 2005/0120886 A1 | 6/2005 | Chen | |
| 2006/0021524 A1 | 2/2006 | Liu | |
| 2009/0178572 A1 | 7/2009 | Wolcott et al. | |
| 2013/0101715 A1 | 4/2013 | Geissler et al. | |
| 2014/0150667 A1 | 6/2014 | Liao | |
| 2014/0287069 A1* | 9/2014 | Warlick | A23F 5/36 |
| | | | 424/725 |

FOREIGN PATENT DOCUMENTS

| | | |
|---|---|---|
| WO | 2005063090 A1 | 7/2005 |
| WO | 2009137915 A1 | 11/2009 |

\* cited by examiner

STEEPING APPARATUS AND METHODS FOR BREWING A BEVERAGE

CROSS-REFERENCE TO RELATED APPLICATIONS

This application claim priority from PCT/GB2017/053502, filed on Nov. 22, 2017, which claims priority from GB 1621221.9, filed Dec. 14, 2016, the contents of which (including all attachments filed therewith) are hereby incorporated by reference in their entirety.

TECHNICAL FIELD OF THE INVENTION

The present invention relates generally to steeping apparatus and methods for brewing a beverage.

BACKGROUND TO THE INVENTION

It is known to produce a flavoured beverage by steeping a solid brewing material in a liquid in order to infuse the liquid with the flavour and aroma of the brewing material. In particular, it is known to produce a beverage by steeping a brewing material in water. For example, it is known to produce tea and coffee beverages by steeping tea leaves or coffee grounds respectively in hot water.

Of the many techniques for brewing coffee around the world, connoisseurs consider the French press technique to be one of the best for taste and efficient use of ground coffee. In a French press, coffee is brewed by placing the ground coffee in an empty container and adding hot water. After the coffee grounds have steeped for several minutes, a plunger is depressed to move a perforated disc and filter down through the brew to contain the coffee grounds in the base of the container. The coffee can then be poured from the container for drinking. In some cases, the container is in the form of a coffee cup and the coffee is drunk straight from the container.

Coffee grounds in the French press technique are wetted thoroughly in water which enables flavours, oils and aromas to be released, capturing a strong aromatic, full flavour brew. Correct wetting is an essential function to produce a tasty cup. The amount of coffee grounds, contact time with water and water temperature during brewing are factors that play into making a desired cup. Coffee grounds are made up of cells, and each of those cells holds some of the coffee solids that are extracted. In fresh coffee, carbon dioxide gas is also trapped in those cells, and wetting releases this gas. This is sometimes called blooming of coffee. When coffee is subjected to extraction, a point is reached where the coffee extracts take a blonde colouration known as blonding or crema of coffee. These factors enhance taste and texture and usually marks the point that additional extraction of coffee grounds will extract bitter elements.

A disadvantage with French-press coffee method is that the grounds remain in contact with the brewed coffee in the container past the preferred steeping period so that the brewed coffee tends to become very strong and bitter over time. Thus, it is generally recommended to remove the coffee right at the end of the preferred steeping period.

U.S. Pat. No. 6,422,133 B1 discloses a modified French press in which a dome shaped buffer element is attached to the plunger above the perforated plate and filter in an attempt to decouple the coffee grounds from the already-steeped coffee once the plunger is depressed. However, this arrangement is not entirely satisfactory since the buffer cannot fully decouple the steeped coffee from the coffee grounds without it becoming difficult to lower the buffer through the coffee. Accordingly, in practice the design of the buffer is a compromise between allowing fluid to pass through or around it so that it can be lowered and effective decoupling the steeped coffee above the buffer from that portion of the coffee which remains in contact with the coffee grounds below the buffer.

Other methods for brewing coffee are known but often involve the use of expensive machinery. Expresso machines have been developed for use in commercial coffee outlets. Whilst these produce high quality coffee, they can be less efficient in their use of coffee grounds than the French press. Brewing an espresso cup will typically use 10 g of coffee grounds to make a 28.4 mL (1 oz.) shot compared to less than half that amount of coffee grounds required in the French press to produce a similar cup of coffee in terms of strength, flavour and aroma. Extensive use of expresso machines is helping drive increasing demands for coffee bean production, which in turn is leading to environmental pressure on forested land converted into coffee growing land.

Other types of machine intended for home use require coffee grounds to be introduced in specially designed, prefilled and sealed pods. This leads to additional packaging waste and can result in the consumer being tied into using proprietary brands of coffee for use in their machine.

There is a need then for alternative steeping apparatus and methods which overcome, or at least mitigate, some or all of the disadvantages of the known apparatus and methods.

There is also a need for alternative steeping apparatus and methods for brewing beverage in which the brewed beverage is more effectively decoupled from the brewing material after steeping.

There is a need in particular for alternative steeping apparatus and methods for brewing coffee which addresses environmental concerns as well as being able to brew a cup of coffee comparable to or better than the French press method.

There is a further need for alternative steeping apparatus and methods for brewing coffee that enables a substantially French press quality of coffee to be made in less time than a conventional French press.

There is a still further need for alternative steeping apparatus and methods for brewing a beverage that can be offered in reusable and disposable containers.

SUMMARY OF THE INVENTION

Aspects of the invention relate to steeping apparatus and methods of brewing a beverage.

According to a first aspect of the invention, there is provided a steeping apparatus for brewing a beverage, the apparatus comprising a container having a base and a wall extending upwardly from the base to define an internal volume and a partition statically mounted in the container to divide the internal volume into an upper chamber above the partition and a lower chamber below the partition, the partition having a peripheral region sealingly associated with the wall and a central region having at least one first aperture for fluidly interconnecting the upper and lower chambers, the partition outside the central region being substantially impervious to air, the apparatus being configured such that in use, a volume of air is trapped within the lower chamber below the partition as the container is filled with liquid.

The partition may be permanently attached to the container at a fixed position and may be formed integrally with the container. The partition may be provided as part of a partition unit locatable in the internal volume at a predetermined position above the base. The partition unit may be mountable to the wall of the container at the predetermined position. In which case, the partition unit may be mounted to the wall by means of a screw threaded connection between the partition unit and part of the wall. Alternatively, the partition unit may be a sliding fit within the container. In which case, the partition unit may have a spacer arrangement for engagement with the base or some other part of the container to hold the partition at the desired position above the base. The spacer arrangement could comprise a plurality of legs that engage with the base. The spacer arrangement could comprises a downwardly depending wall which engages with the base of the container. In an embodiment, the partition unit comprises a downwardly depending wall and a second base which define a chamber below the partition, wherein the second base and/or the downwardly depending wall contact the (first) base of the container to position the partition within the container.

Where the partition is not formed integrally with the container, the partition or partition unit may have a peripheral seal for engagement with the wall of the container.

The partition may be concave, the central region of the partition being located below the peripheral region of the partition. In an embodiment, the partition is tapered becoming narrower towards the central region. The partition may be in the form of a funnel. This is advantageous as brewing material in the upper chamber is guided towards and through the at least one first aperture into the lower chamber by the funnel shaped partition as it sinks in the upper chamber. The partition may have the shape of a (inverted) frustum of a cone or pyramid.

The partition may have a single first aperture which may be located centrally. Alternatively, there may be a number of first apertures in the central region.

In an embodiment, the container defines an inlet for introducing said liquid into the internal volume, the inlet opening into the upper chamber, the arrangement being configured such that in use as a liquid is introduced into the upper chamber through said inlet, some of the liquid enters the lower chamber through said at least one first opening to partially fill the lower container, a volume of air being trapped in the lower chamber in a region located laterally outside the central region of the partition as the lower chamber fills with liquid. The inlet may be defined at an upper end of the wall.

The container may comprise two releasably connected parts, a lower part which defines the base and at least part of the wall and an upper part which defines at least a further part of the wall. The two parts of the container may be releasably connected together, say by means of a screw threaded connection or a push fit connection or any other suitable arrangement. In an embodiment, the lower part comprises the base and a first wall portion extending upwardly from the base, the partition being releasably mounted to the first wall portion. In an alternative embodiment, the partition is mounted to the upper part of the container. The partition may be integrally formed with the upper part of the container. The partition may be formed integrally at a lower end of the upper part. The lower part of the container may comprise the base and a first wall portion extending upwardly from the base and the upper part of the container may comprise a second wall portion, the first and second wall portions together defining the wall of the container when the parts are assembled. An upper region of the first wall portion of the lower part may overlap the second wall portion of the upper part of the container. The upper region of the first wall portion of the lower part may overlap the second wall portion of the upper part over substantially the entire height of the upper part. The upper region of the first wall portion of the lower part may overlap the second wall portion of the upper part on the outside.

In accordance with a second aspect of the invention, there is provided a method of brewing a beverage using apparatus in accordance with the first fist aspect of the invention, the method comprising: introducing a liquid into the upper chamber such that some of the liquid passes through the at least one first aperture to partially fill the lower chamber, continuing to introduce said liquid until the upper chamber is filled to a desired level, wherein a volume of air is trapped in the lower chamber.

In the method, a brewing material may be present in the upper chamber when the liquid is introduced into the upper chamber such that at least some of the brewing material is brought into suspension in the liquid in the upper chamber as it is filled, and the method may comprise allowing the brewing material to steep in the upper chamber for a period of time, at least some of the brewing material sinking to the bottom of the upper chamber and passing through the at least one first aperture to enter the lower chamber.

The method may comprise brewing coffee or tea.

In accordance with a third aspect of the invention, there is provided a steeping apparatus for brewing a beverage, the apparatus comprising a container having a base and a wall extending upwardly from the base to define an internal volume, the apparatus having a partition arranged in use to be located within the internal volume in connection with the wall to define within the internal volume an upper chamber above the partition and a lower chamber below the partition, the partition having a central region in which at least one first aperture for interconnecting the upper and lower chambers is located, the connection between the partition and the wall of the container being substantially air-tight and the partition outside the central region being substantially impervious to air such that in use, the partition is capable of holding a volume of air trapped within the lower chamber when the container is full of liquid.

In an embodiment, the partition is arranged in use to be located stationarily within the container before the container is filled with liquid and may be formed integrally with the wall of the container.

In an embodiment, the partition is provided as a separate unit arranged in use to be introduced into the container after it has been filled with liquid, the partition unit slidably engaging with the wall of the container to form a substantially air-tight connection. In an embodiment, an upper end of the container wall defines an opening through which the partition unit is inserted into internal volume, the wall of the container extending upwardly beyond an intended maximum liquid fill level of the upper chamber, the arrangement being configured such that in use as the partition unit is inserted into the internal volume, the partition unit engages the wall of the container to form an air-tight connection at a position which is spaced above the maximum intended liquid fill level.

The partition unit may have a peripheral seal for engagement with the wall of the container to form said substantially air-tight connection. The partition unit may be attached to a handle to assist in locating the partition unit within the container.

At least part of the partition outside of the central region may be located below the air-tight connection with the wall of the container.

The partition may be concave, the central region being located below a region of contact between the partition and the wall of the container.

The partition may be generally funnel shaped.

The partition may have a single, centrally located first aperture.

In accordance with a fourth aspect of the invention, there is provided a steeping apparatus for brewing a beverage, the apparatus comprising a container having a base and a wall extending upwardly from the base to define an internal volume and a partition unit removably insertable in the internal volume, the partition unit having a partition which when the unit is positioned in the internal volume extends across the internal volume to define within the internal volume an upper chamber above the partition and a lower chamber below the partition, the partition having a central region in which at least one first aperture for interconnecting the upper and lower chambers is located, the partition unit engaging the wall of the container in a substantially air-tight manner and the partition outside the central region being substantially impervious to air.

The partition unit may include a filter element located below the at least one first aperture, the partition unit defining an enclosed fluid flow path from the filter to at least one first aperture.

The partition may be concave, the central region being located below a region of contact between the partition and the wall of the container. The partition may be funnel shaped.

In accordance with a fifth aspect of the invention, there is provided a method of brewing a beverage using apparatus in accordance with the fourth aspect of the invention, the method comprising:

a. introducing a brewing material into the interior volume of the container and filling the internal volume with a liquid up to a desired fill level;

b. allowing the brewing material to steep in the liquid for a period of time;

c. with the partition unit initially engaged in an upper region of the interior volume, lowering the partition unit down through the liquid towards the base of the container after the period of time has elapsed, trapping at least some of the brewing material in the lower chamber below the partition; wherein, d. as the partition unit is introduced into the interior volume, a volume of air is trapped in the lower chamber below the partition and is drawn down inside the interior volume with the partition unit as it is lowered.

The method may comprise introducing the partition unit into the upper region of the interior volume before steeping is completed, the partition unit being retained in the upper region until the period of time has elapsed and subsequently lowered through the liquid. Alternatively, the method may comprise introducing the partition unit into the upper region of the interior volume only after the period of time has elapsed.

The method may be used to brew coffee from coffee grounds.

In apparatus in accordance with any of the first, third and fourth embodiments, the volume of the upper chamber may be larger than the volume of the lower chamber.

In apparatus in accordance with any of the first, third and fourth embodiments, the partition may have at least one air bleed aperture located outside said central area, the at least one bleed aperture being smaller than the, or each, first aperture.

In apparatus in accordance with any of the first, third and fourth embodiments, the at least one first aperture may be initially sealed by means of a membrane dissolvable in said liquid.

In apparatus in accordance with any of the first, third and fourth embodiments, the size of said at least one first aperture may be adjustable.

In apparatus in accordance with any of the first, third and fourth embodiments, the apparatus may have a filter arrangement for filtering a steeped liquid in the upper chamber.

In apparatus in accordance with any of the first, third and fourth embodiments, the apparatus may comprise a lid removably mountable to the container. The lid member may have a dispensing opening through which a beverage in the upper chamber can be consumed. The lid may have a closure member movable between a closed position in which it closes the dispensing opening and an open position in which a beverage may be dispensed through the dispensing opening. The container may be a cup and the lid may be releasably mountable to an upper edge of the cup. The cup may be reusable or it may be a single use disposable cup.

DETAILED DESCRIPTION OF THE INVENTION

In order that the invention may be more clearly understood an embodiments thereof will now be described, by way of example only, with reference to the accompanying drawings, of which:

FIG. 20b is an exploded, sectional view of the lid of FIG. 20a;

Figure 1:
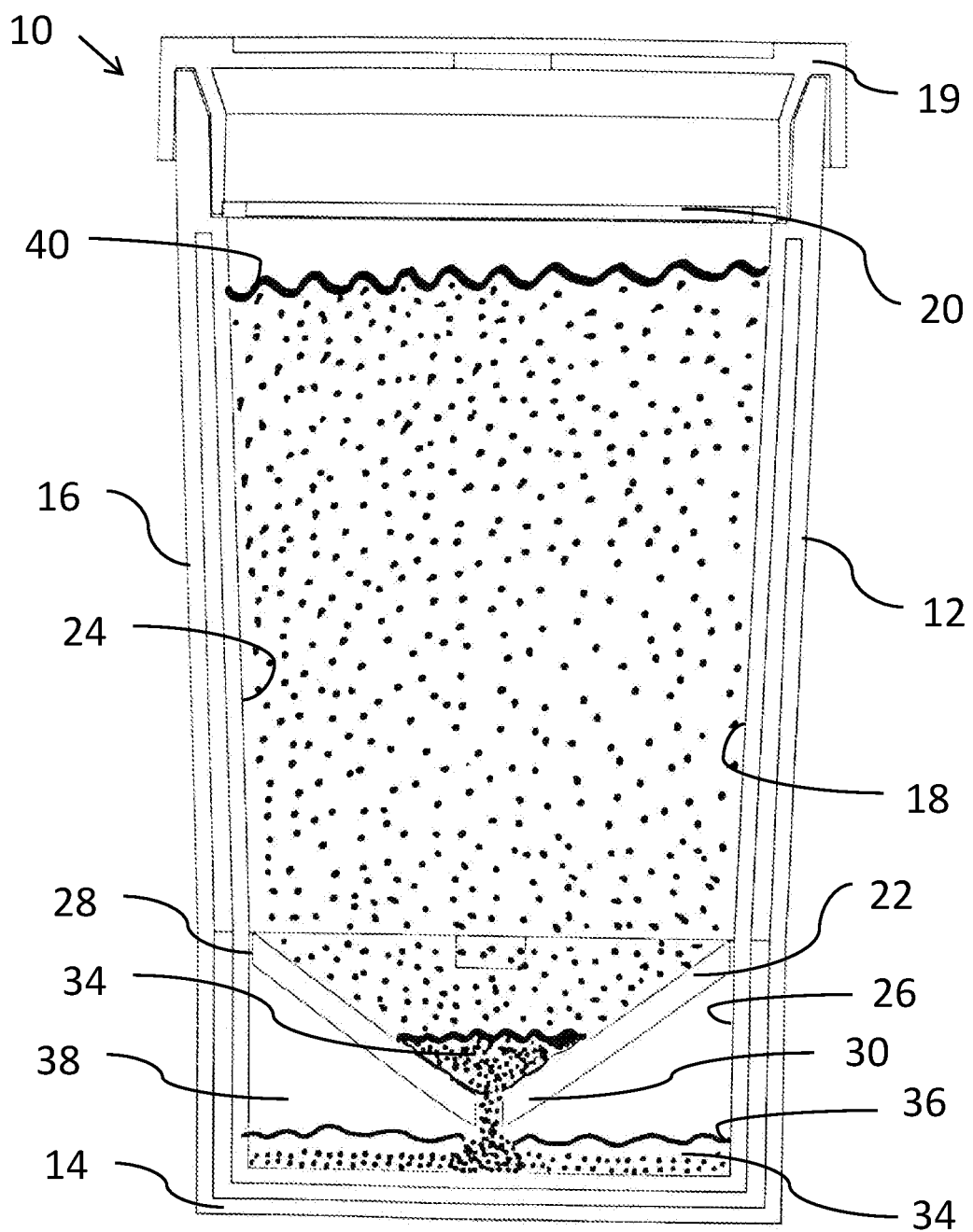
FIG. 1 is a somewhat schematic longitudinal cross sectional view through an embodiment of a steeping apparatus in accordance with an aspect of the invention, showing the apparatus in an early stage of use.
Figure 2:
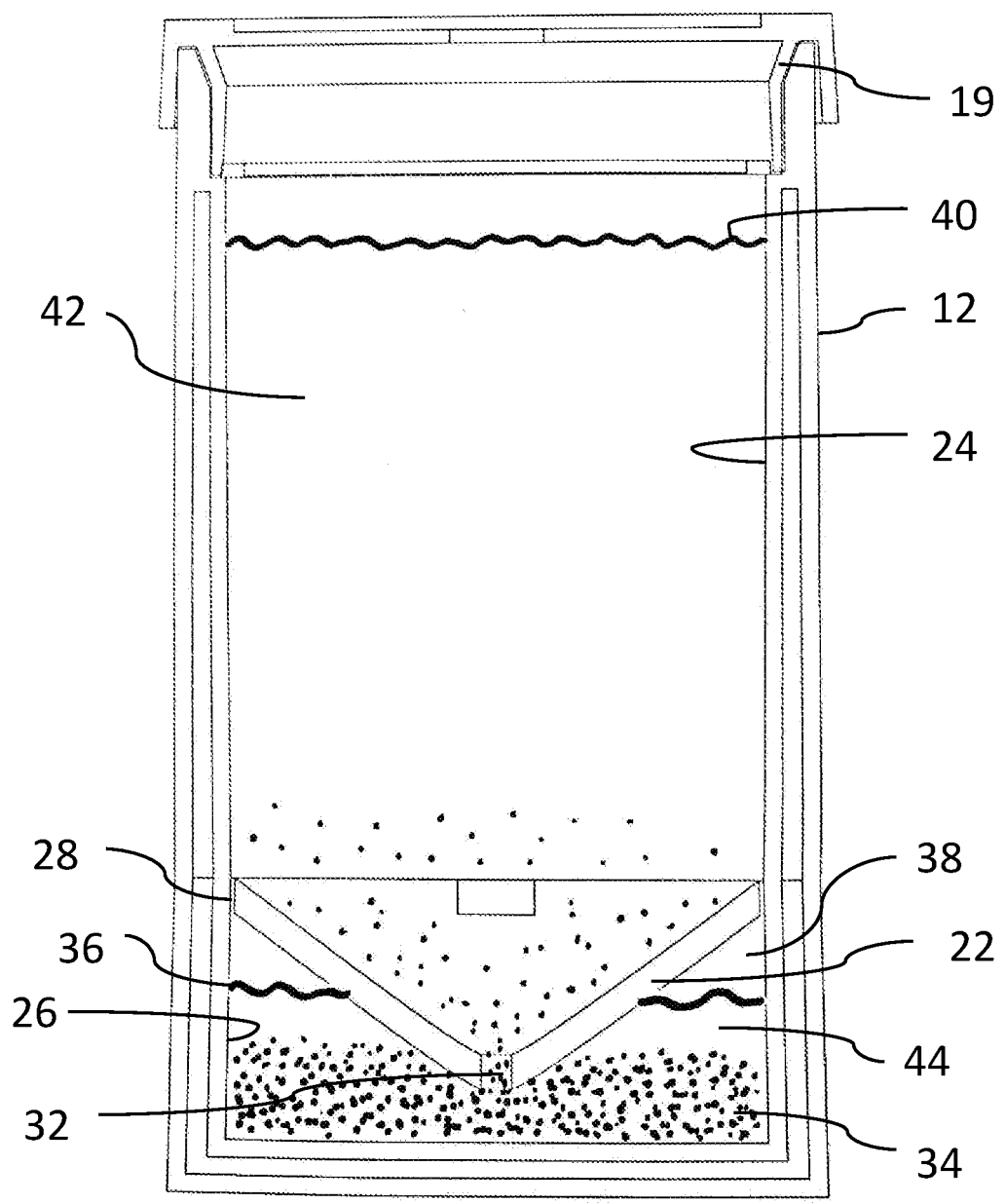
FIG. 2 is a view similar to that of FIG. 1 but showing the apparatus in a later stage of use.
Figure 3:
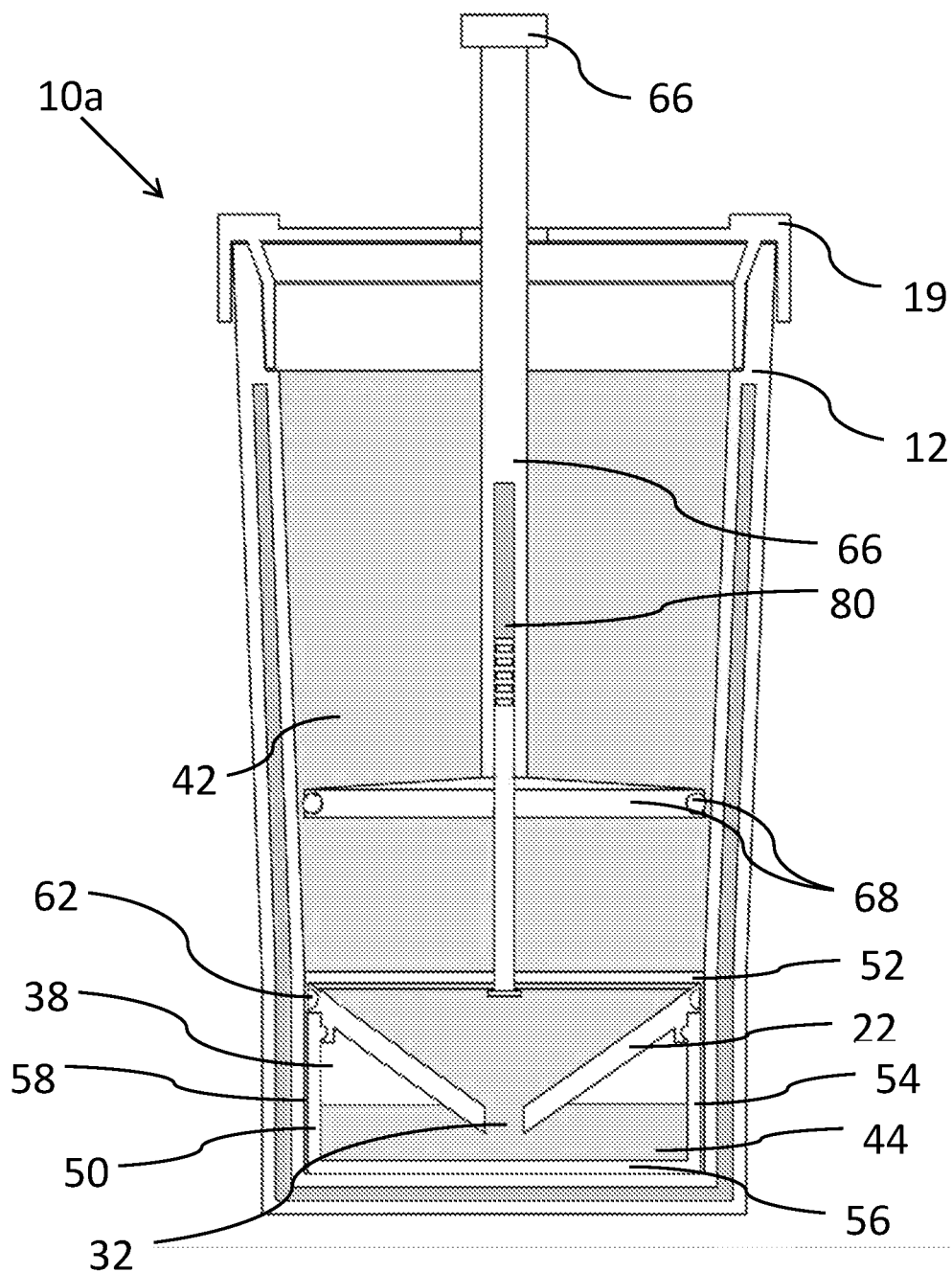
FIG. 3 is a somewhat schematic longitudinal cross sectional view through a further embodiment of a steeping apparatus in accordance with an aspect of the invention.
Figure 4:
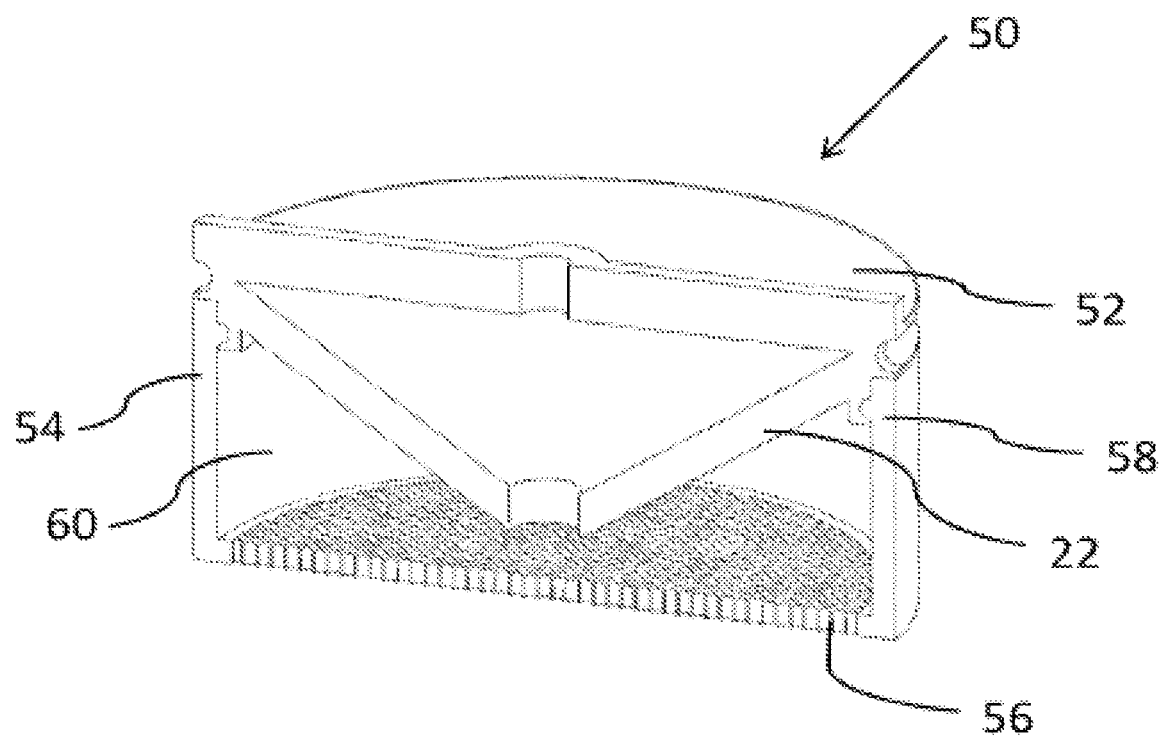
FIG. 4 is a sectioned perspective view of an alternative partition unit for use in the apparatus of FIG. 3.

An embodiment of a steeping apparatus 10 in accordance with an aspect of the invention is illustrated in FIGS. 1 and 2. The apparatus 10 according to the present embodiment is configured for brewing coffee from coffee grounds using hot water. However, steeping apparatus in accordance with an aspect of the invention can be used to brew other types of beverage including tea and cold beverages in which a solid beverage material is steeped in cold water. Indeed, apparatus and methods in accordance with aspects of the invention are not limited to producing beverages but can be used in other applications where a solid food material is to be steeped in a liquid.

The apparatus 10 includes a container 12 having a base 14 and a peripheral wall 16 extending upwardly from the perimeter of the base to define an internal volume 18 for holding a liquid, which in this case is hot water. The container 12 is open at the upper end of the peripheral wall 16 and a removable lid 19 is fitted to the upper end of the wall to close the container. The container 12 is in the form of a cup and can be made from any suitable material such as glass, metal, ceramics, polymeric materials, paper, Polystyrene, and combinations thereof. At least the peripheral wall 16 of the container may be insulated to reduce the transfer of heat across the wall and/or the container can be provided with an outer insulating sleeve in a known manner for takeaway coffee cups. The wall 16 could be a double wall to aid heat insulation and the container could be provided in the form of a vacuum flask to preserve the desired temperature of the liquid.

The lid 19 can also be made from any suitable materials, including any of those mentioned above and is fitted to the container 12 to form a sealed closure. In an embodiment, the lid is a polymeric lid which is a press fit over a lip on the upper end of the container in a known manner for takeaway coffer cups. However, the lid 19 could be mounted to the container using a screw type connection or by any other suitable arrangement. The lid 19 may include a dispensing opening (not shown) and may include a filter 20 through which coffee brewed in the container passes in order to exit through the dispensing opening in the lid.

Statically located within the container 12 is a partition 22 which divides the interior volume into an upper chamber 24 for holding a brewed beverage (in this case coffee) and a lower chamber 26 for holding at least some of the brewing material 24 (in this case coffee grounds) after steeping. The partition 22 is fixedly mounted within the container 12 closer to the base 14 than the top so that the volume of the upper chamber 24 is larger than that of the lower chamber 26. In this embodiment, the container is circular in lateral cross-section and the partition 22 is conical. However, the container need not be circular and the partition can be appropriately shaped for use in a non-circular container. An outer periphery 28 of the partition is connected with the wall 16 of the container in a substantially airtight manner. A central, radially inner region 30 of the partition is located below the outer periphery 28 proximal but spaced from the base 14. The partition 22 can be made of any suitable material which is impervious to water (or whichever liquid is to be used in the apparatus) and to air. The partition 22 has a first aperture 32 at its centre but is otherwise solid so as to form a substantially impervious barrier to prevent liquid and air passing between the chambers 24, 26 other than through the central aperture 32. The term "solid" is used in this context to mean that the partition is unperforated. However, the partition could be made of a flexible material and the term solid should not be interpreted as necessarily requiring the partition to be rigid.

The partition 22 could be formed integrally with the wall 16 of the container or it could be a separate unit mounted within the container interior volume 18. Where the partition 22 is a separate unit, an outer periphery of the unit engages with the wall 16 of the container to form a substantially airtight fit. Such a partition unit may include a peripheral seal member for contact with the wall 16 of the container. The seal member may be a seal ring mounted about a main body of the partition unit or to part of an assembly unit which incorporates or defines the partition. Such a seal ring can be made from any suitable material such as an elastomeric or otherwise resilient material including but not limited to: rubber or rubberised material, plastic, polymeric materials, or silicon, for example.

Use of the apparatus 10 to brew a cup of coffee will now be described, with reference to FIGS. 1 and 2.

With the container 12 initially empty and the lid 19 removed, coffee grounds 34 are introduced into the upper chamber 24 on top of the partition. Inevitably, some of the coffee grounds 34 will fall through the central aperture 32 into the lower chamber 26 but the majority will stay in the upper chamber. Hot water is then poured into the upper chamber 24 on top of the partition. Some of the water will pass through the central aperture 32 into the lower chamber 26 but given the relatively small size of the aperture, the upper chamber 24 will begin to fill with water taking the majority of the coffee grounds 34 into suspension in the upper chamber. As water passes into the lower chamber 26, the water level 36 in the lower chamber rises until it passes above the level of the central aperture 32, as indicated in FIG. 2. At this point, air can no longer escape from the lower chamber 26 and so a volume of air 38 becomes trapped in the lower chamber. The air 38 is trapped in a peripheral region of the lower chamber adjacent the partition, which peripheral region surrounds the central region 30 of the partition in which the aperture 32 is provided. The water level 36 in the lower chamber continues to rise until the air 38 tapped in the lower chamber reaches a pressure at which it exerts sufficient force on the water in the lower chamber as to prevent further water from entering the lower chamber through the central aperture 32. The user continues adding water to the upper chamber 24 until it reaches a desired fill level 40, which may be marked on the container wall.

Once the container 12 is full, the lid 19 can be fitted to retain heat and close the container. The coffee grounds 34 are allowed to steep in the upper chamber 24 where they are thoroughly wetted to extract the full flavour. As part of the extraction process, the coffee grounds 34 take on some of the water and become denser and naturally sink to the bottom of the upper chamber 24 where they pass through the central aperture 32 in the partition to enter the lower chamber 26. The conical, funnel-like shape of the partition 22 helps to guide the coffee grounds 34 towards the central aperture 32 as they sink in the upper chamber. Eventually, when the extraction process is complete, the majority of the coffee grounds 34 will have passed into the lower chamber 26 to leave a well brewed coffee 42 in the upper chamber 24. The movement of coffee grounds into the lower chamber 26 can also be aided by movement of the container which will occur though natural handling. Whilst some coffee grounds 34 may stay in the upper chamber 24, these will be caught by the filter 20 and so are not consumed by the user.

The coffee grounds 34 in the lower chamber 26 are effectively isolated from the brewed coffee 42 in the upper chamber 24 so that the coffee 42 can be retained in the upper chamber 24 for some time without becoming bitter. The coffee grounds 34 are isolated from the brewed coffee 42 in part due to the partition 22 forming a physical barrier between the two chambers over the majority of the cross sectional area of the interior volume 18 of the container. However, in addition but without wishing to be bound by theory, it is believed that the force exerted on the liquid 44 in the lower chamber 26 by the trapped air 38 inhibits the bodies of liquid 42, 44 in the two chambers from mixing through the central aperture 32, thus substantially decoupling the brewed coffee 42 in the upper chamber 24 from the liquid 44 in the lower chamber 26. Since the coffee grounds which have passed into the lower chamber 26 no longer interact with the brewed coffee 42 in the upper chamber 24, the apparatus 10 and method of brewing overcome the problems of the French press. Furthermore, the coffee grounds 34 can be allowed to steep for longer at a slower pace in the upper chamber so that the coffee 42 produced is highly flavourful. The apparatus 10 and method of use in accordance with aspects of the invention has been found to produce coffee which is comparable in quality to French press coffee using a similar amount or less of coffee grounds 34. Accordingly, adoption of the apparatus and methods according to aspects of the invention in place of expresso machines, for example, can help reduce the overall quantity of coffee consumed and thus reduce environmental pressures.

The amount of air 38 trapped in the lower chamber 26, and thus the force exerted on the liquid 44 in the lower chamber, is determined by a number of factors including the height of the partition 22 above the base 14 the depth of the partition (e.g. the vertical distance between the peripheral seal and the lowest part of the partition, such as the central region containing the aperture 32). Thus the design of the apparatus 10 can be modified to ensure an optimum amount of air 38 is trapped by appropriately selecting the depth of the partition and/or the vertical distance between the periphery 28 and the base 14. The amount of air 38 trapped can also be controlled by providing one or more air bleed holes in the partition 22 outside of the central region 30. Such air bleed holes would be significantly smaller than the central aperture 32 so as to allow only a limited amount of air to escape whilst minimising the contact between the liquids 42, 44 in the upper and lower chambers. Alternatively, the sealing connection between the partition 22 and the wall 16 may not be perfectly airtight so that some air 38 is allowed to escape whilst retaining at least some air in the lower chamber. Accordingly, the connection between the partition 22 and the wall 16 need not be perfectly airtight and the partition 22 need not be completely impervious to air outside of the central region 30, providing that the partition is configured to trap a volume of air 38 within the lower chamber 26, the volume of air being more than a de minimis amount.

The partition 22 need not have a single, first aperture 32 at its centre but could be provided with one or more first apertures 32 within the central region 30 close to the apex. Where there is more than one first aperture 32, the apertures 32 could be of different sizes. Furthermore, whilst the use of a conical or funnel-like partition is advantages in guiding the brewing material towards the central aperture and hence into the lower chamber, this is not essential and in other embodiments the partition need not be in the shape of a cone or funnel. Where the container is not circular, the partition can be a correspondingly shaped concave member such as the frustum of a pyramid. The partition could be produced in other concave shapes, such as a dome, in which the central region 30 is located below the periphery 28. Indeed, whilst use of a concave partition 22 in which the central region 30 is located below the periphery 28 is has the benefit of trapping a relatively large volume of air 38 in the lower chamber and in guiding the brewing material into the lower chamber, the partition could be substantially flat, provided that the partition 22 is configured so as to trap at least a small volume of air about the periphery of the lower chamber. For example, provided that at least part of the partition or a structure connected therewith inboard of the connection with the wall 16 extends below the level of the peripheral seal (between the partition and the wall), a small volume of air can be trapped below the seal.

The dimension of the central aperture 32 or apertures can be selected as required for any particular application. It is expected that where the aperture is circular, it will typically have a diameter in the range of 3 to 30 mm inclusive, depending on the size of the container. For a container which holds a single cup of coffee, say for use as a travel mug or disposable coffee cup, the central aperture 32 might be expected to have a diameter in the range of 6 to 10 mm inclusive, whilst a larger container for brewing a number of cups might have a central aperture with a diameter in the range of 10 to 15 mm inclusive. It will be appreciated that the central aperture 32 need not be circular but would be expected in at least some embodiments to have a similar cross sectional area to the hole sizes indicated above. The size of the central aperture 32 may be made variable by including an adjustable valve arrangement or by use of means for fully or partially blocking off the aperture 32. This might include use of a float that opens and closes the aperture as liquid is introduced into the container. Such arrangements are particularly suitable where the apparatus is intended to be reused a number of times rather than being a single use disposable item.

Where the partition 22 is not integral with the wall 16 of the container 12, it can be located in the container by any suitable means. The partition 22 can be part of a unit having self-locating walls which engage the base 14. The partition 22 or partition unit may also have a rod or handle which can be used to position it within the container and which may be detachable.

Whilst the apparatus 10 as illustrated in FIGS. 1 and 2 is configured as a single drink cup, the teaching regarding the use of a partition 22 to trap air in the lower chamber in order to isolate the brewing material in the lower chamber from the brewed beverage in the upper chamber can be applied equally for use in a cafetiere or other coffee or tea pot for brewing multiple cups of a steeped beverage to be dispensed into cups or other containers for drinking.

FIGS. 3 to 19 illustrate a range of modifications which can be made to the basic apparatus 10 as described above. These will be discussed briefly.

FIGS. 3 to 6 illustrate a modified version of the apparatus 10a in which the partition 22 is provided as part of a partition unit 50 that sits on the base 14 of the container within the interior volume of an outer container. The partition unit 50 is an assembly which includes an upper portion 52 incorporating the partition 22 and a lower portion 54 which includes a second base 56 and an upstanding peripheral wall 58 and so that a substantially enclosed volume 60 is defined between the partition 22, the base 56 and the wall 58. The upper portion 52 and the lower portion 54 are seperable and mounted together by means of a press fit, though they could be assembled by means of a screw connection or any other suitable method. A sealing ring 62 is mounted about the periphery of the partition 22 to engage the peripheral wall 16 of the container to form an airtight seal. When located in the container, the interior volume 60 of the partition unit 50 defines the lower chamber 24 into which the coffee grounds 34 sink. The advantage of this arrangement is that, after use, the partition unit 50 can be removed from the container 12 and the upper and lower parts separated to allow for easy disposal of the coffee grounds. In a modified arrangement illustrated in FIG. 4, the base 56 of the partition unit 50 is perforated or provided as a filter mesh to allow liquid to drain out when it is removed from the container whilst retaining the coffee grounds.

Figure 5:
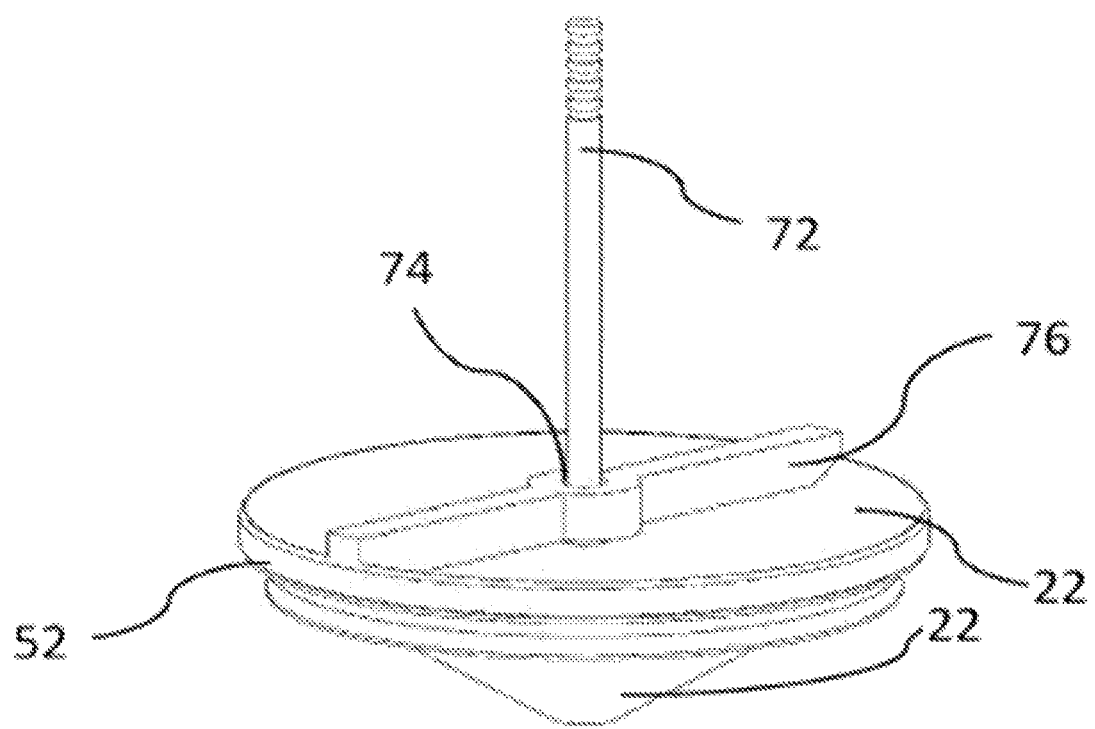
FIG. 5 is a perspective view of part of a partition forming part of the apparatus of FIG. 3.
Figure 6:
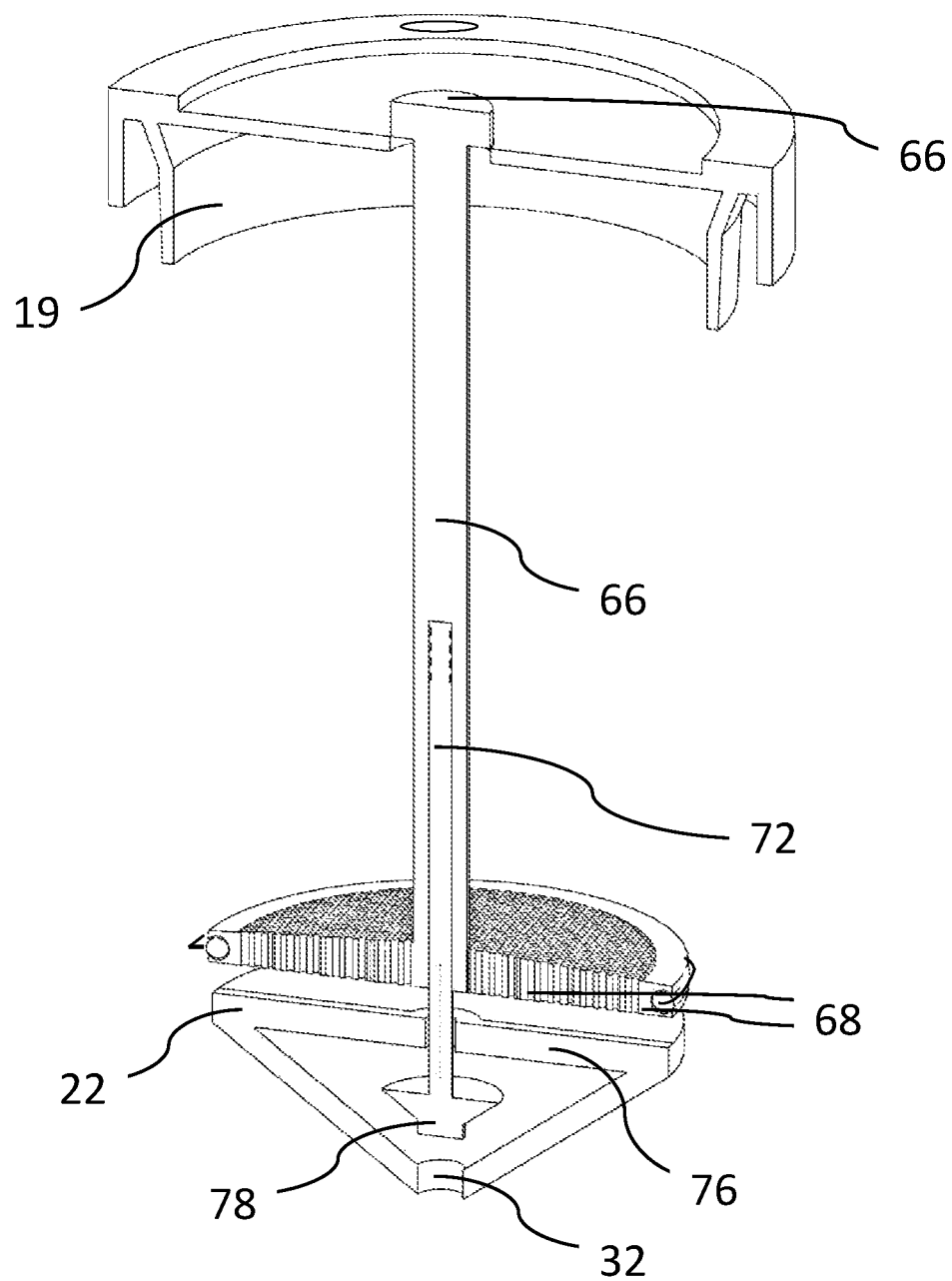
FIG. 6 is a sectioned perspective view of part of the apparatus of FIG. 3.

FIGS. 5 and 6 show parts of the apparatus 10a in more detail and illustrate how a French press mechanism can be incorporated into the apparatus together with a plug mechanism for closing the aperture 32 in the partition after steeping. These drawings only show the upper part 52 of the partition unit 50.

The French press mechanism includes a plunger 66 which passes through a central aperture in the lid 19 and which carries at its lower end a filter assembly 68 which is received in the upper chamber 24. The filter assembly 68 can be any suitable arrangement. As illustrated, the filter assembly can be in the form of a filter disc with perforations to allow liquid through and which has a peripheral seal for engagement with the wall of the container. However, any filter arrangement such as those known for use in a French press can be adopted. These typically include a perforated support disc onto which is mounted a filtering screen or mesh and a coiled spring for pressing the screen on to the wall.

In use, with the partition unit at the bottom of the container 12, the plunger 66 is initially in a raised position so that the filter assembly is at the top of the upper chamber 24 whilst the coffee is being brewed. After brewing is complete, the plunger 66 is depressed to move the filter assembly 68 down through the brewed coffee in the upper chamber 24 to trap any remaining coffee grounds below the filter assembly 68 and move them towards the bottom of the upper chamber. The majority of the coffee grounds will pass through the central aperture 32 into the lower chamber. Whilst some coffee grounds may be trapped between the filter assembly 68 and the partition 22, there will be far fewer than in a convention French press and so will have only a limited effect on the flavour of the brewed coffee.

The plug mechanism 70 for closing off the central aperture 32 in the partition includes a rod 72 which is slidably inserted through a central aperture 74 in a cross member 76 extending across the top of the partition 22. A plug-like head 78 is attached to the end of the rod 72 below the cross member 76. The head 78 is dimensioned and shaped to engage in the aperture 32 in the partition to close off the aperture when the rod is depressed and is too large to pass through the aperture 74 in the cross member. The free upper end of the rod 72 is slidingly received in a central bore 80 in the plunger 66, the bore being longer than the rod.

In use, the partition unit 50 including the plug mechanism 70 is placed on the base 14 inside the container 12 with the rod 72 and head 78 in a raised position so that the aperture 32 in the partition is open. The coffee grounds and hot water are added as previously described. The lid 19 and the French press mechanism are the mounted to the container, with the plunger 66 raised. The rod 72 is guided into the central bore 80 in the plunger. Once the coffee is brewed, the plunger 66 is depressed to lower the filter assembly 68. Initially the plunger 66 and filter assembly 68 are able to move downwardly for a distance whilst the plug mechanism 70 remains raised. After the free play between the plunger 66 and the rod 72 has been taken up, further downward movement of the plunger moves the rod 72 and head 78 downwardly towards the partition. When the plunger is fully depressed, the head 78 engages in the aperture 32 to effectively close the aperture 32 and the filter assembly 68 is fully depressed. Once the coffee has been consumed or poured out from the upper chamber 24, the lid 19, plunger 66 and filter assembly can be removed to leave the partition unit 50 and plug mechanism 70 in place. To remove the partition unit 50, a user can grasp the rod 72 and lift it upwardly so that the head 78 engages the cross member 76 and the partition unit 50 is drawn out of the container.

It should be appreciated that a French press type filter mechanism could be incorporated in the apparatus 10a without the plug mechanism 70 and, conversely, that a plug mechanism 70 could be incorporated without a French press type filter assembly. It should also be appreciated that alternative handle means can be connected to the partition unit 50 to help in its insertion into the container and/or removal.

Figure 7:
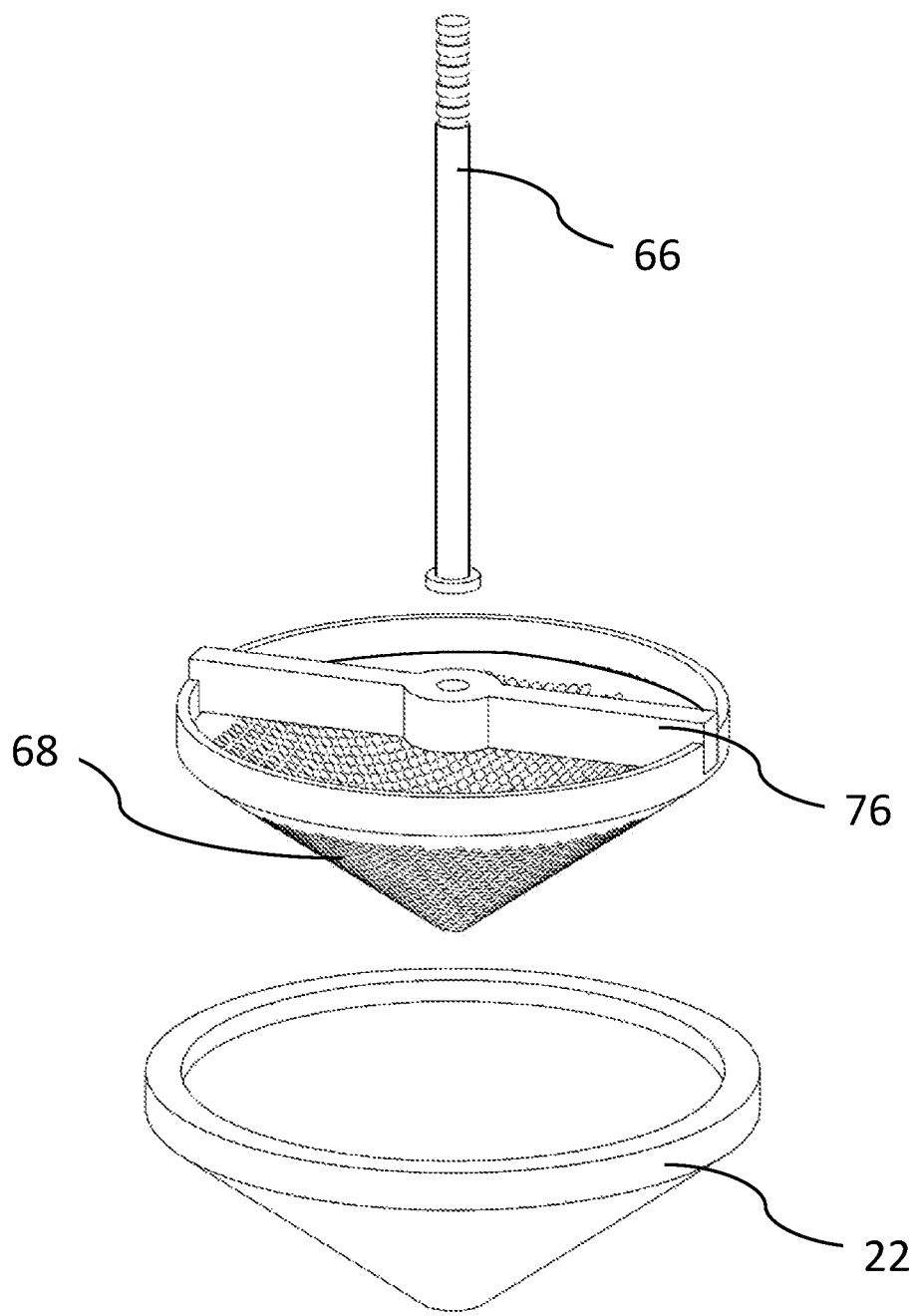
FIG. 7 is a perspective view of an alternative embodiment of a partition and filter for use in a steeping apparatus in accordance with an aspect of the invention.

As illustrated in FIG. 7, the filter assembly 68 need not be in the form of a disc but can be shaped to conform to the shape of the partition 22. In this embodiment, both the partition and the filter assembly are conical or funnel shaped. It should also be appreciated that use of a French press and/or plug mechanism is not limited to an apparatus in which the partition is part of a partition unit 50.

Figure 8:
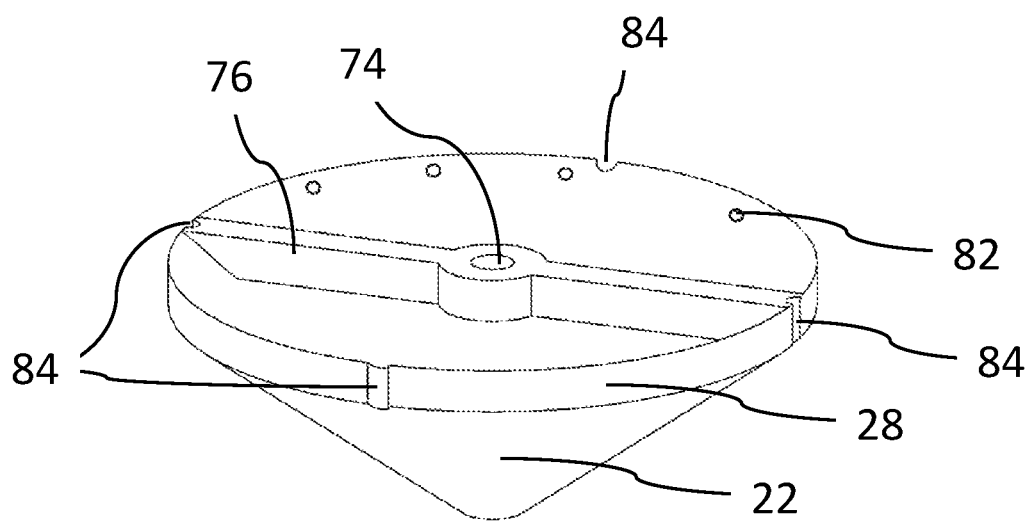
FIG. 8 is a perspective view of a partition for use in a steeping apparatus in accordance with an aspect of the invention showing optional features for controlling the amount of air trapped below the partition in use.

As discussed previously, the amount of air trapped below the partition 22 can be controlled by providing air bleed holes in the partition and/or by providing a less than perfectly airtight seal between the partition and the wall of the container. FIG. 8 illustrates how air bleed holes 82 can be provided close to the perimeter of the partition 22 and how grooves 84 or other irregularities can be provided about the periphery of the partition 22 where it contacts the wall to allow some air to pass from the lower chamber to the upper chamber. The use of air bleed holes and/or grooves about the periphery can be incorporated in any of the embodiments disclosed.

Figure 9:
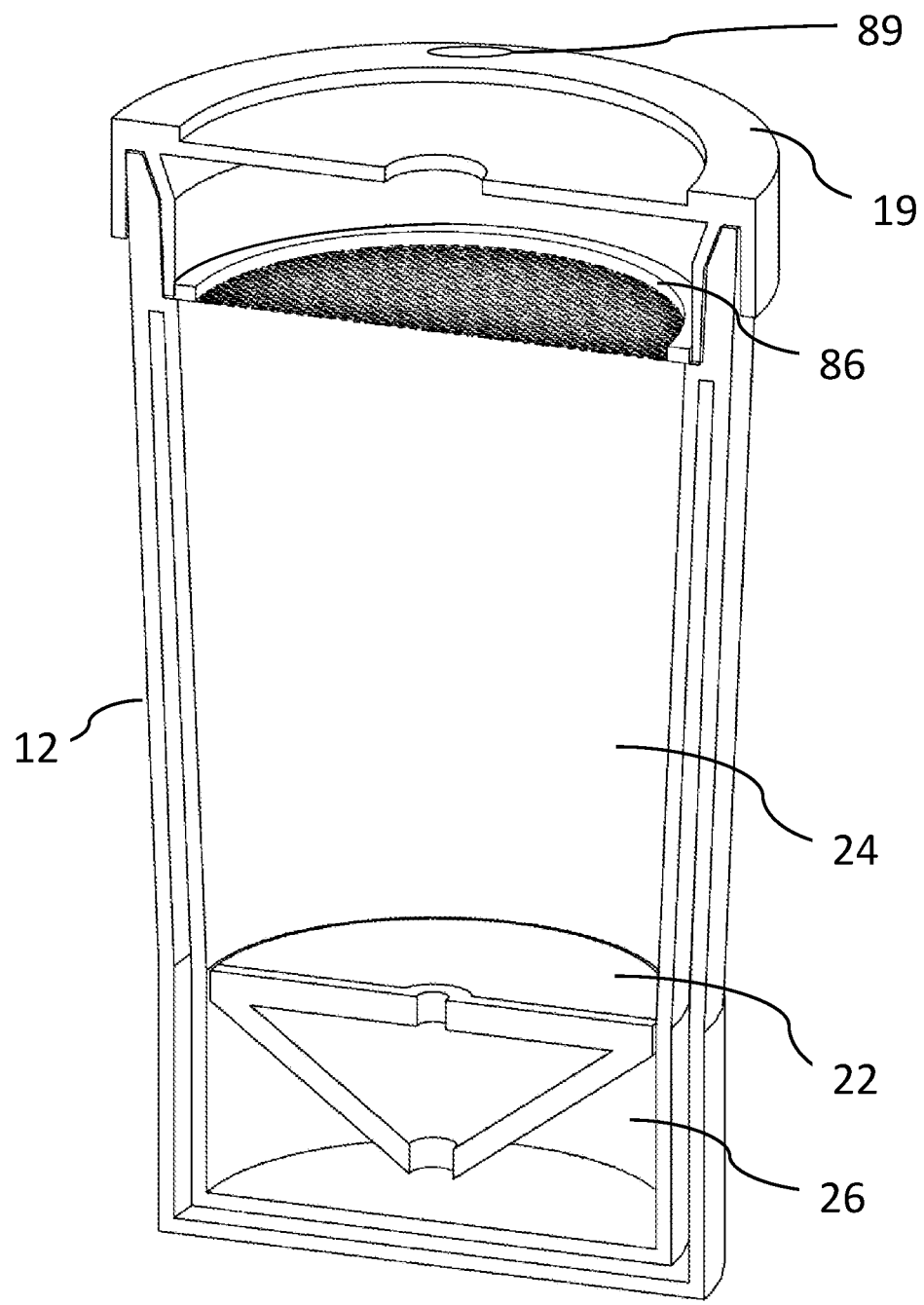
FIGS. 9 and 10 are somewhat schematic longitudinal sectioned perspective views respectively of further embodiments of a steeping apparatus in accordance with an aspect of the invention.

FIG. 9 illustrates how a fixed filter 86 can be incorporated at an upper end of the container 12 or within the lid 19 to filter out any remaining coffee grounds from the brewed coffee before it reaches a dispensing opening or aperture 89 in the lid.

Figure 10:
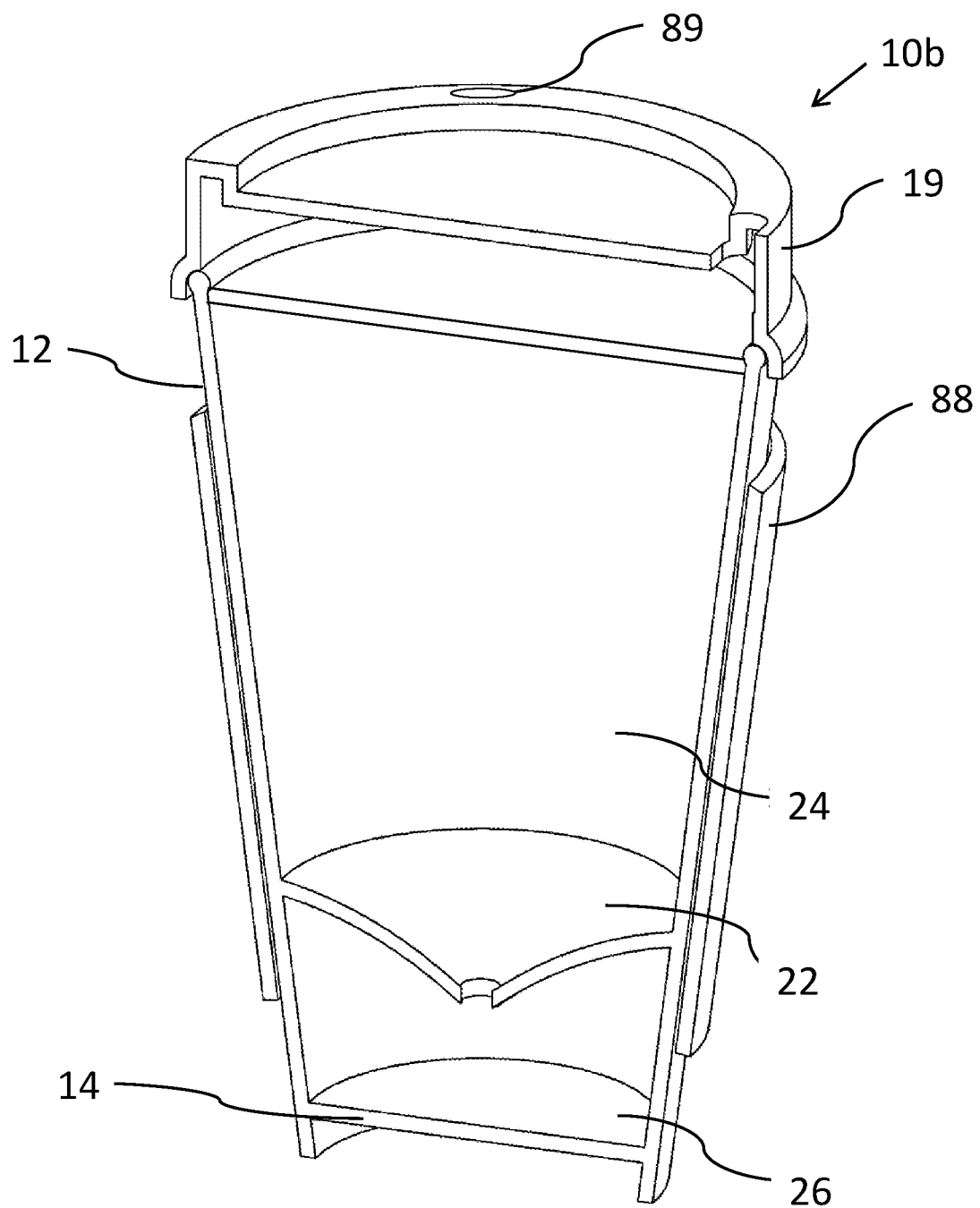

FIG. 10 illustrates an embodiment of the steeping apparatus 10b which is in the form of a disposable, singe use cup. The partition 22 is integrally formed with the wall 16 of the container, though this is not essential and a separate partition could be secured in place. An insulating sleeve 88 is provided about the wall 16 of the container and the lid 19 is a press fit plastics lid with a dispensing opening 89.

Figure 11:
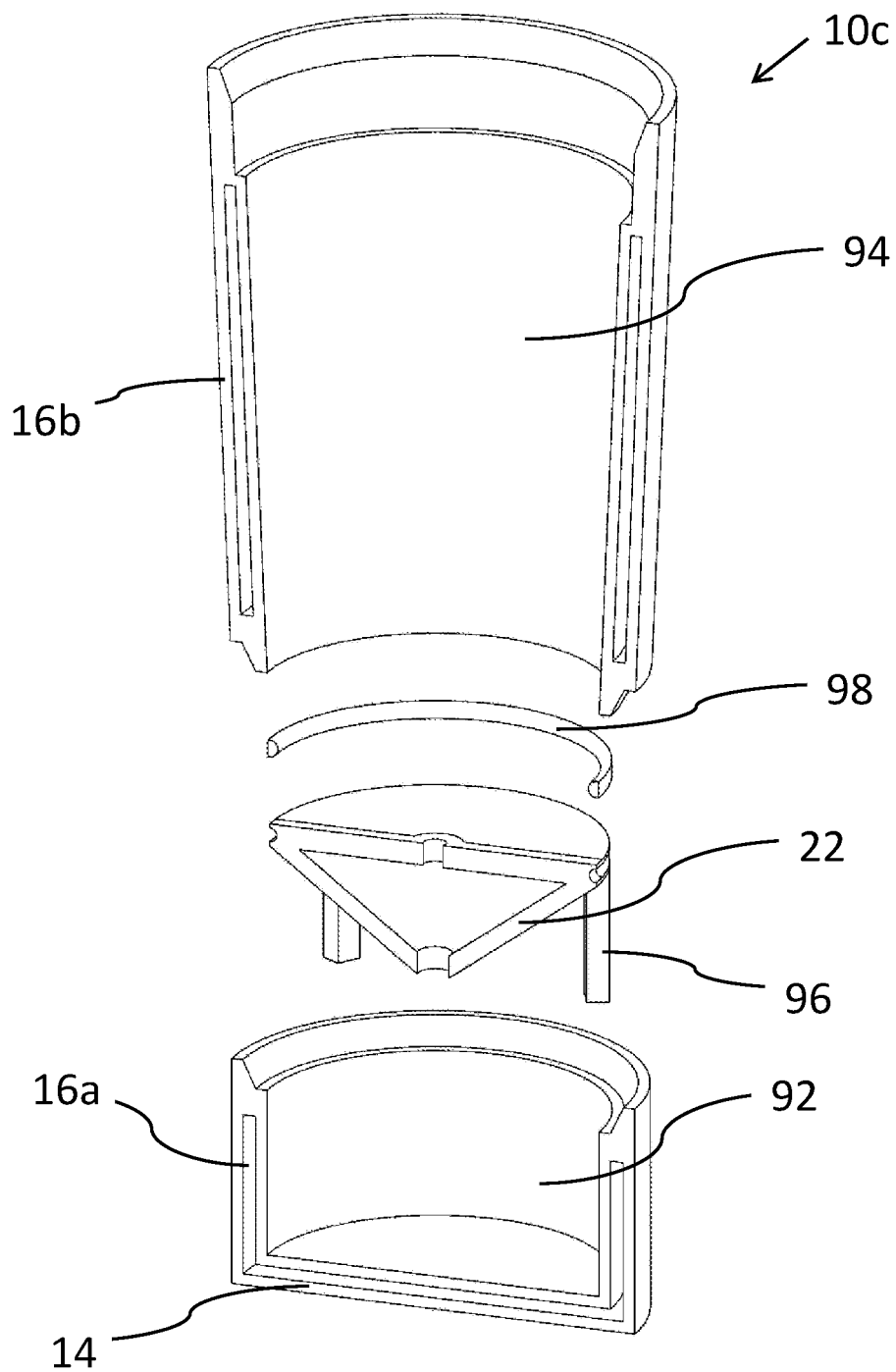
FIG. 11 is a somewhat schematic exploded, longitudinal sectioned perspective view of a further embodiment of a steeping apparatus in accordance with an aspect of the invention.

FIG. 11 illustrates a further embodiment of the apparatus 10c in which the container is in two parts, a lower part 92 and an upper part 94. The lower part 92 includes the base 14 and part of the peripheral wall 16a whilst the upper part 94 includes the remainder of the peripheral wall 16b. The partition 22 is provided as a separate unit 50 which is placed inside the lower part 92. The unit 50 includes legs 96 that engage the base 14 to position the partition 22 at the correct height within the container and a seal 98 is provided about the outer periphery of the partition/unit for engagement with the interior surface of the container to ensure a substantially airtight seal. The two parts 92, 94 of the container are assembled together in any suitable manner and a seal can be provide between them to ensure there is no leakage in use. The parts 92, 94 of the container could be assembled with a push fit, a snap fit, or a screw-fit, for example. In use, the partition is assembled into the lower part 92 of the container and the upper part 94 of the container connected to the lower part 92. In a modification a peripheral part of the partition 22 may locate between the two parts 92, 94 of the container to secure it in position. The arrangement allows for ease of assembly and disassembly and for cleaning the apparatus 10c after use. The arrangement is suitable for a re-usable cup.

Figure 12:
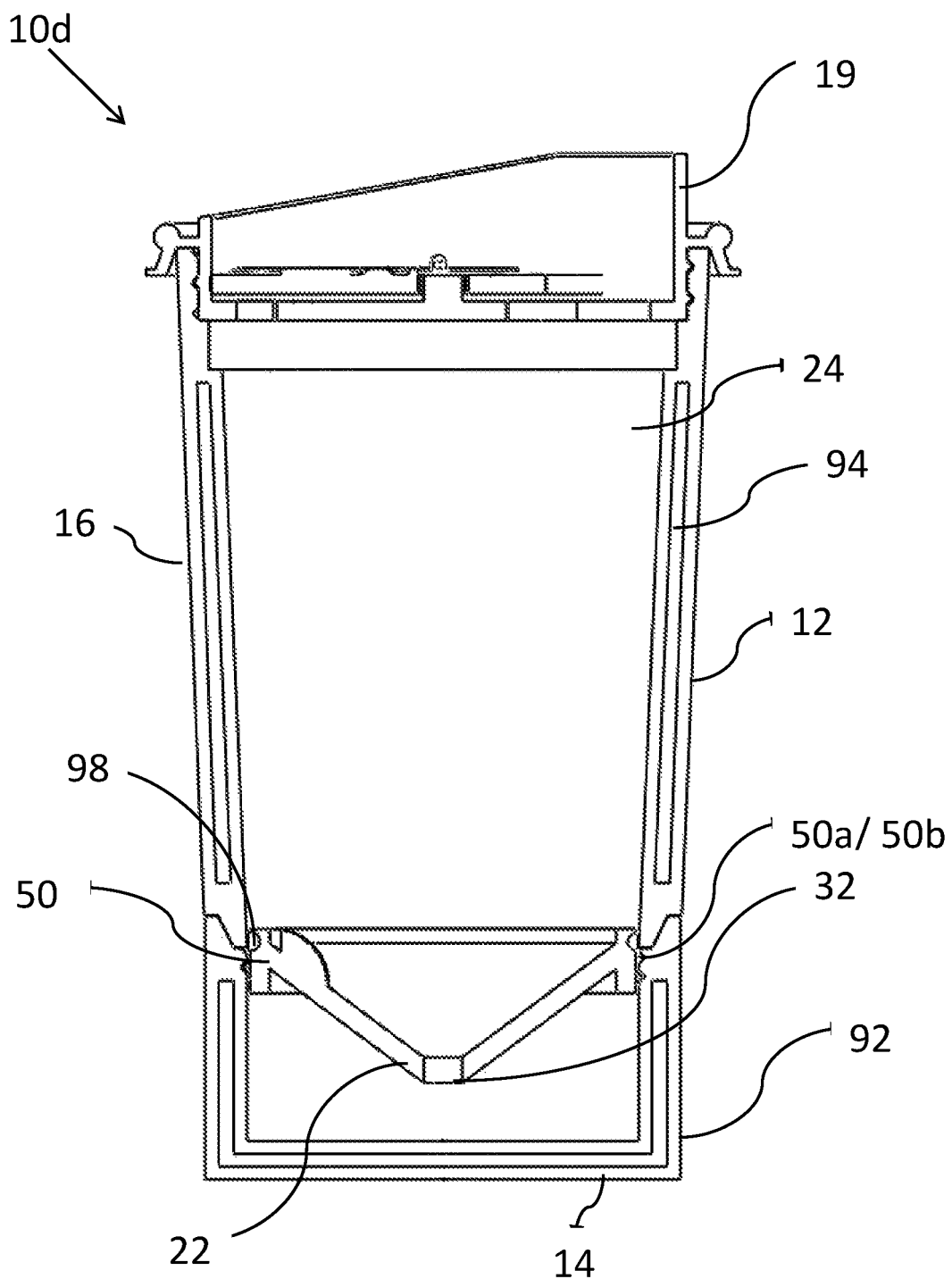
FIG. 12 is a somewhat schematic longitudinal sectioned view of a still further embodiment of a steeping apparatus in accordance with an aspect of the invention.
Figure 13:
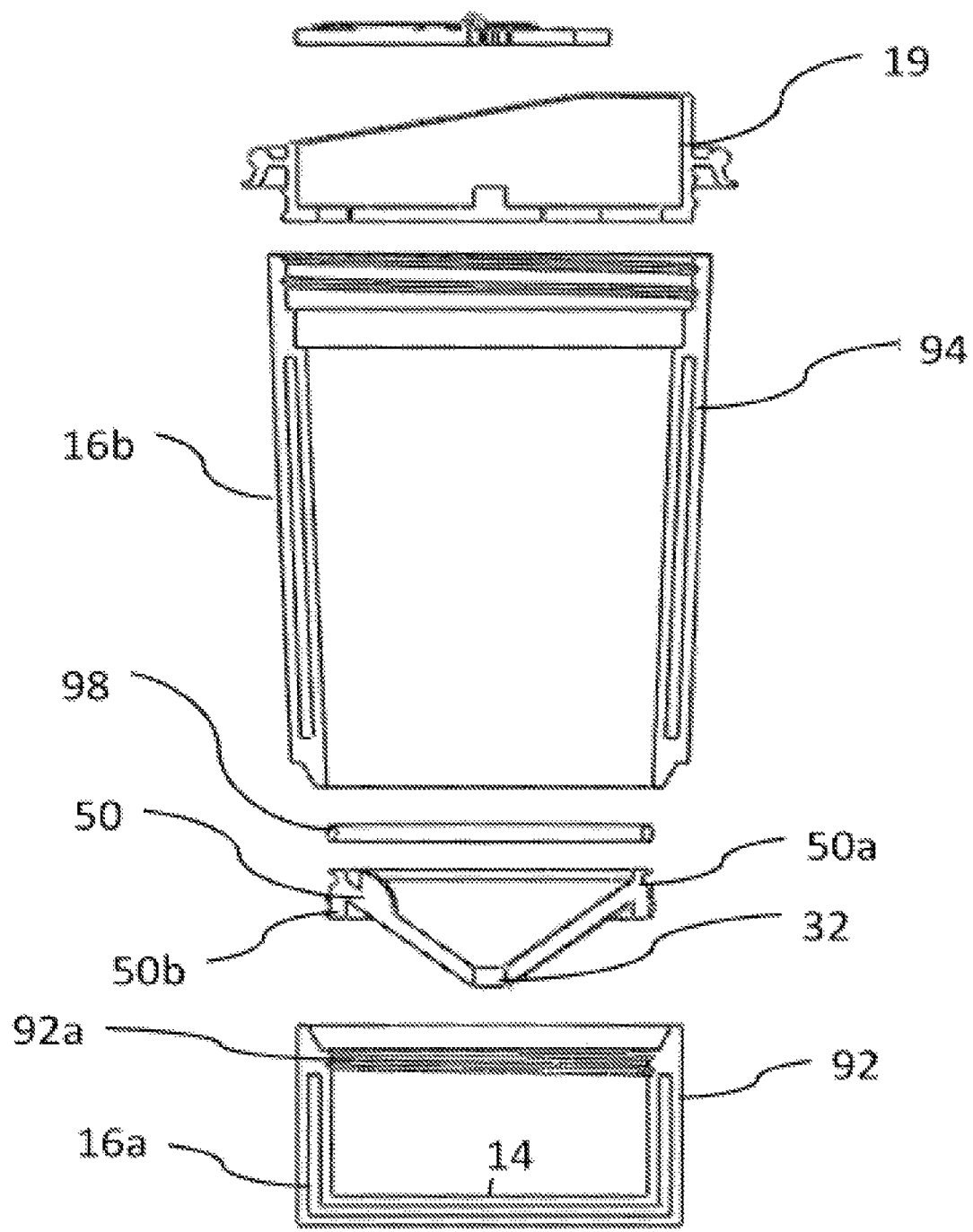
FIG. 13 is an exploded longitudinal sectioned view of the steeping apparatus of FIG. 12.

It will be appreciated that different partitions 22 and/or partition units 50 can be adopted in embodiments having a two-part container, including any of those disclosed herein in relation to alternative embodiments. FIGS. 12 and 13 for example illustrate an alternative embodiment of apparatus 10d in the form of a reusable cup having a two-part container in which the partition 22 is provided as part of a unit 50 which is a screw fit onto the upper end of the lower part 92 of the container. The unit 50 has an outer peripheral region 50a with a screw thread 50b which engages with a corresponding screw thread 92a on an inner surface of the lower part 92 of the container. A resilient seal ring 98 locates about an outer periphery of the partition unit 50 close to the upper edge of the partition for engagement with an inner surface of the upper part 94 of the container to ensure a substantially airtight seal. As with the previous embodiment, the two parts of the container 92, 94 are assembled together in any suitable manner and a seal can be provide between them to ensure there is no leakage in use. The parts 92, 94 of the container could be assembled with a push fit, a snap fit or a screw-fit, for example. In use, the partition unit 50 is mounted to the lower part 92 of the container and then the upper part of the container 94 mounted to the lower part. Coffee or tea can then be brewed as described above by introducing brewing material into the upper chamber 24 above the partition and filling the container with hot water. The brewing material steeps in the upper chamber, gradually sinking into the lower chamber through the central aperture 32. After the brew has been consumed, the apparatus can be taken apart, the used brewing material disposed of and the apparatus cleaned for re-use.

FIGS. 14 to 19 illustrate further alternative embodiments in which the container is made in two seperable parts for cleaning but which differ from the previous embodiment in that the partition 22 is formed integrally at the lower end of the upper part 94 of the container. Forming the partition 22 integrally with the upper part 94 of the container reduces the number of separate parts in the apparatus, which simplifies manufacture and use.

Figure 14:
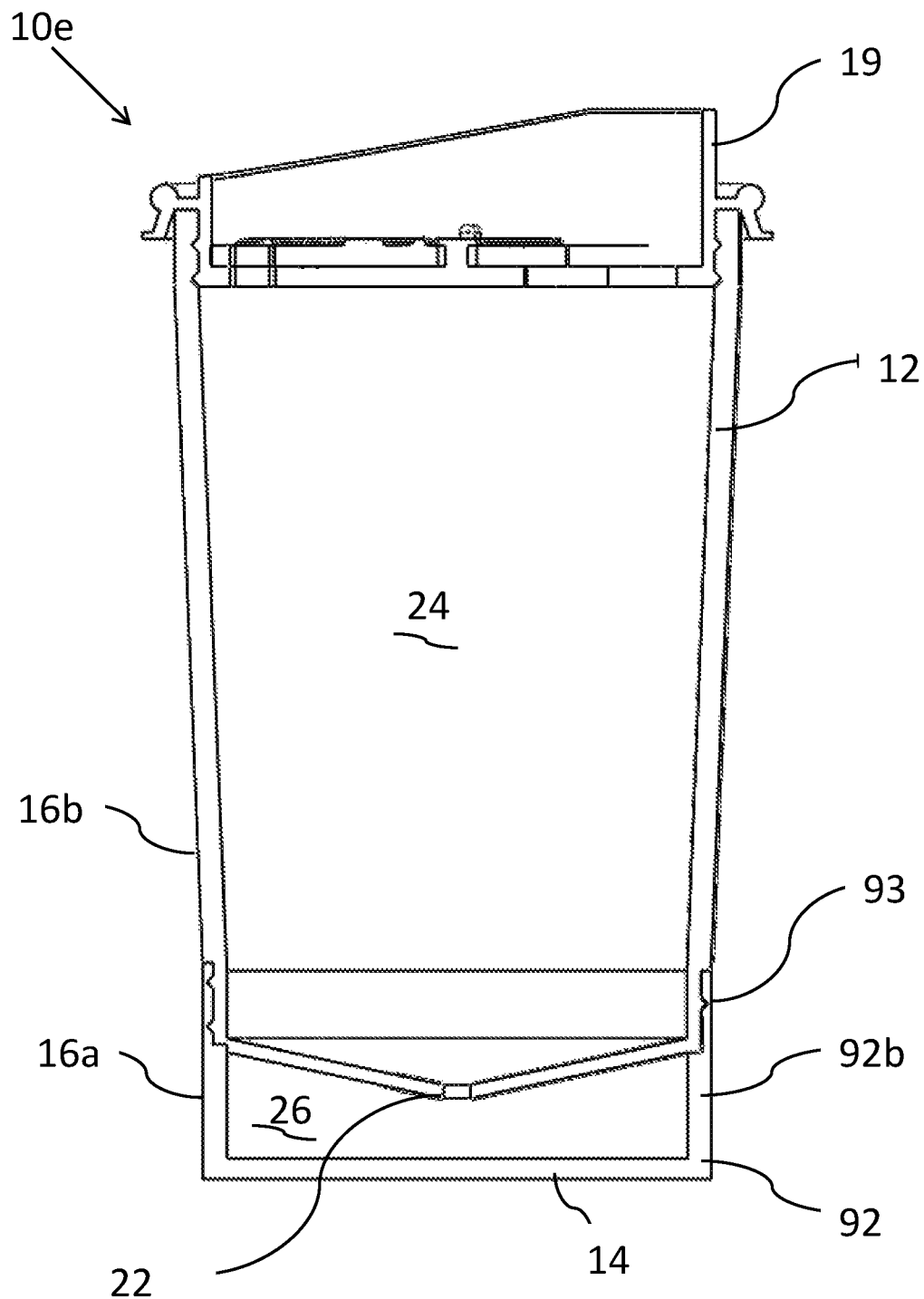
FIG. 14 is a somewhat schematic longitudinal sectioned view of a yet further embodiment of a steeping apparatus in accordance with an aspect of the invention.
Figure 15:
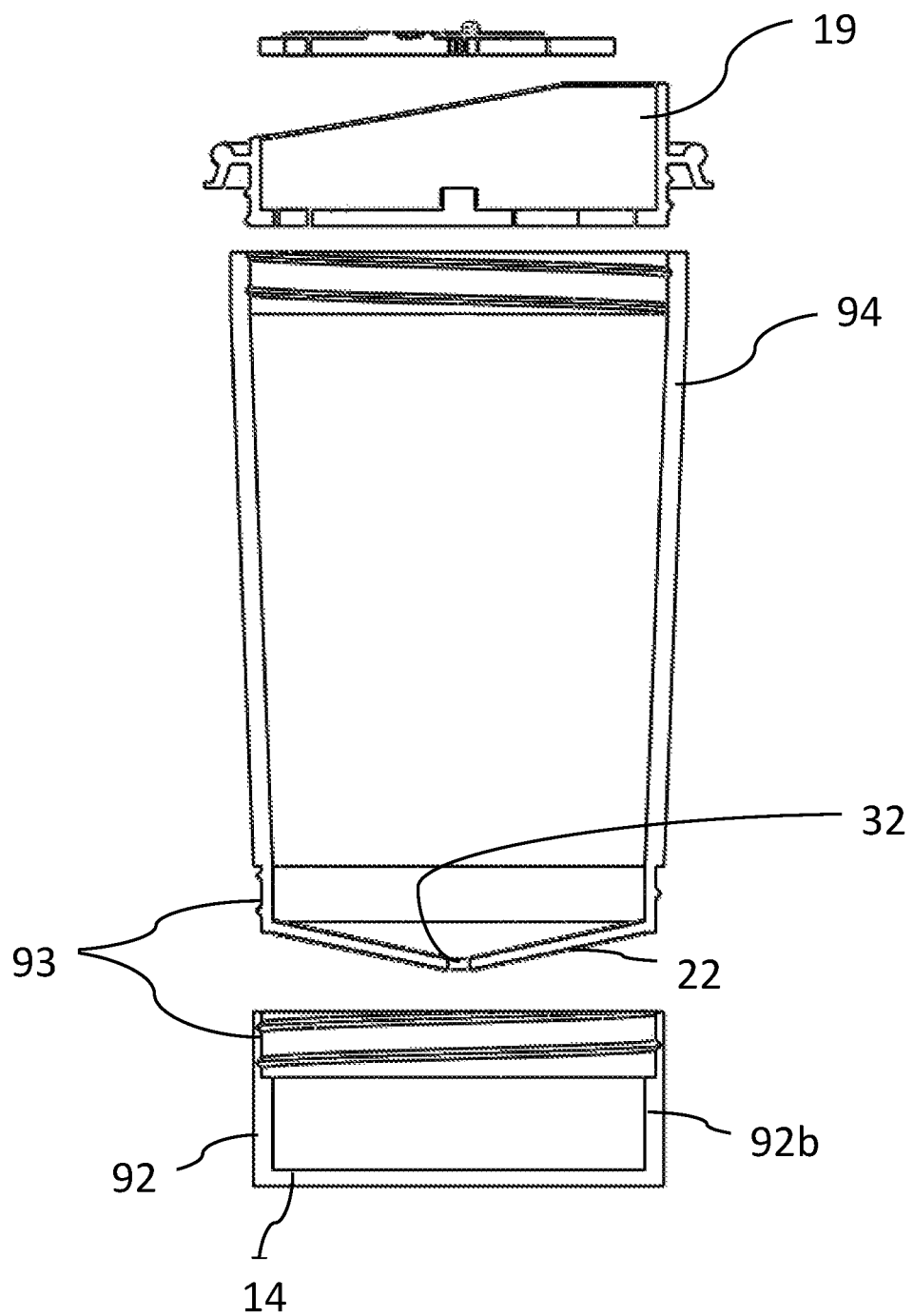
FIG. 15 is an exploded longitudinal sectioned perspective view of the steeping apparatus of FIG. 14.

FIGS. 14 and 15 illustrate apparatus 10e in accordance with a first of these alternative embodiments which is suitable for use as a re-usable cup. The lower part 92 of the container includes the base 14 and a peripheral wall portion 92b which forms part of the peripheral wall 16a below the partition in the assembled container whilst the upper part 94 defines the remainder of the peripheral wall 16b. An upper edge of the peripheral wall portion 92b of the lower part 92 of the container is a screw fit to a lower end of the upper part 94 of the container by a suitable thread 93, wherein the screw fit is sufficiently tight as to prevent leaks in use. The partition 22 is formed integrally at the lower end of the upper part 94 so that when the two parts are connected together, the partition 22 divides the interior of the container into upper and lower chambers 24, 26 as described in relation to previous embodiments. The two parts 92, 94 of the container can be easily separated to dispose of used brewing material and for cleaning before being reassembled for subsequent use.

Figure 16:
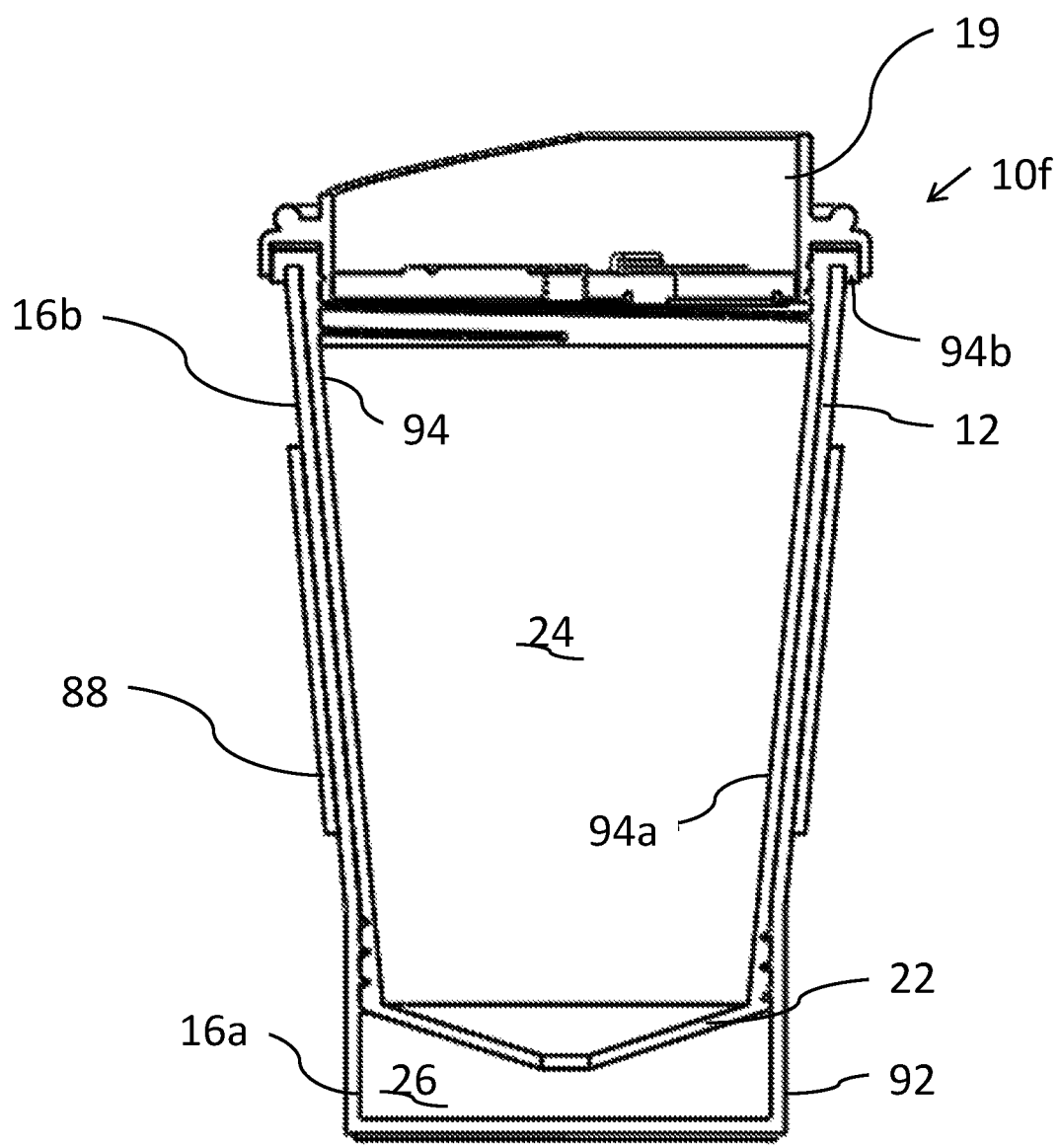
FIG. 16 is a somewhat schematic longitudinal sectioned view of another embodiment of a steeping apparatus in accordance with an aspect of the invention.
Figure 17:
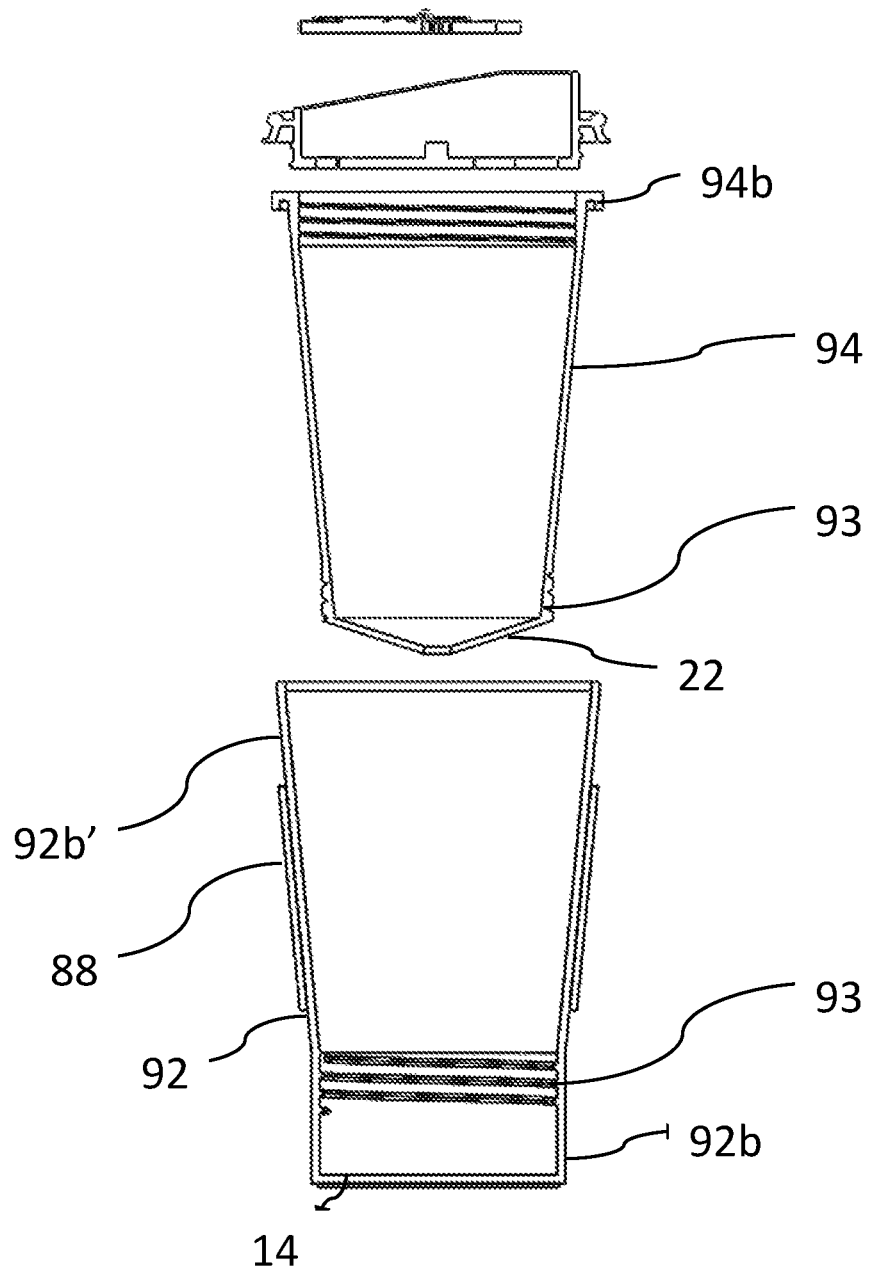
FIG. 17 is an exploded longitudinal sectioned view of the steeping apparatus of FIG. 16.

In the embodiment shown in FIGS. 16 and 17, the apparatus 10f is largely similar to the previous embodiment 10e, except that the peripheral wall portion 92b of lower portion 92 extends upwardly at 92b' outside the peripheral wall portion 94a of the upper part 94 so that the overlapping wall portions 92b', 94a define the peripheral wall 16b above the partition. The peripheral side wall portion 92b of the lower part extends over substantially the whole of the length of the upper part and its upper edge is received within a downturned lip 94b on the upper edge of the upper part 94. This arrangement has the advantage that once assembled, no join is visible between the two parts of the container. This is both aesthetically pleasing and reduces the risk of leakage between the two. The overlapping peripheral wall portions of the two parts 92, 94 also help to reduce the heat transfer through the peripheral wall 16 in use so that the cup is easier to hold. To further reduce heat transfer to a user's hand and to make the cup even easier to hold, an insulating sleeve 88 is provided on the outer surface of the peripheral side wall portion 92b of the lower part. The insulating sleeve 88 can be made of any suitable material, such as rubber (synthetic or natural) or silicon, for example. A similar insulating sleeve 88 can be provided on any of the embodiments disclosed herein. In the embodiment as illustrated, the upper part 94 tapers, getting narrower from top to bottom, and the overlapping peripheral side wall portion 92b of the lower part is correspondingly tapered above the screw thread 93.

Figure 18:
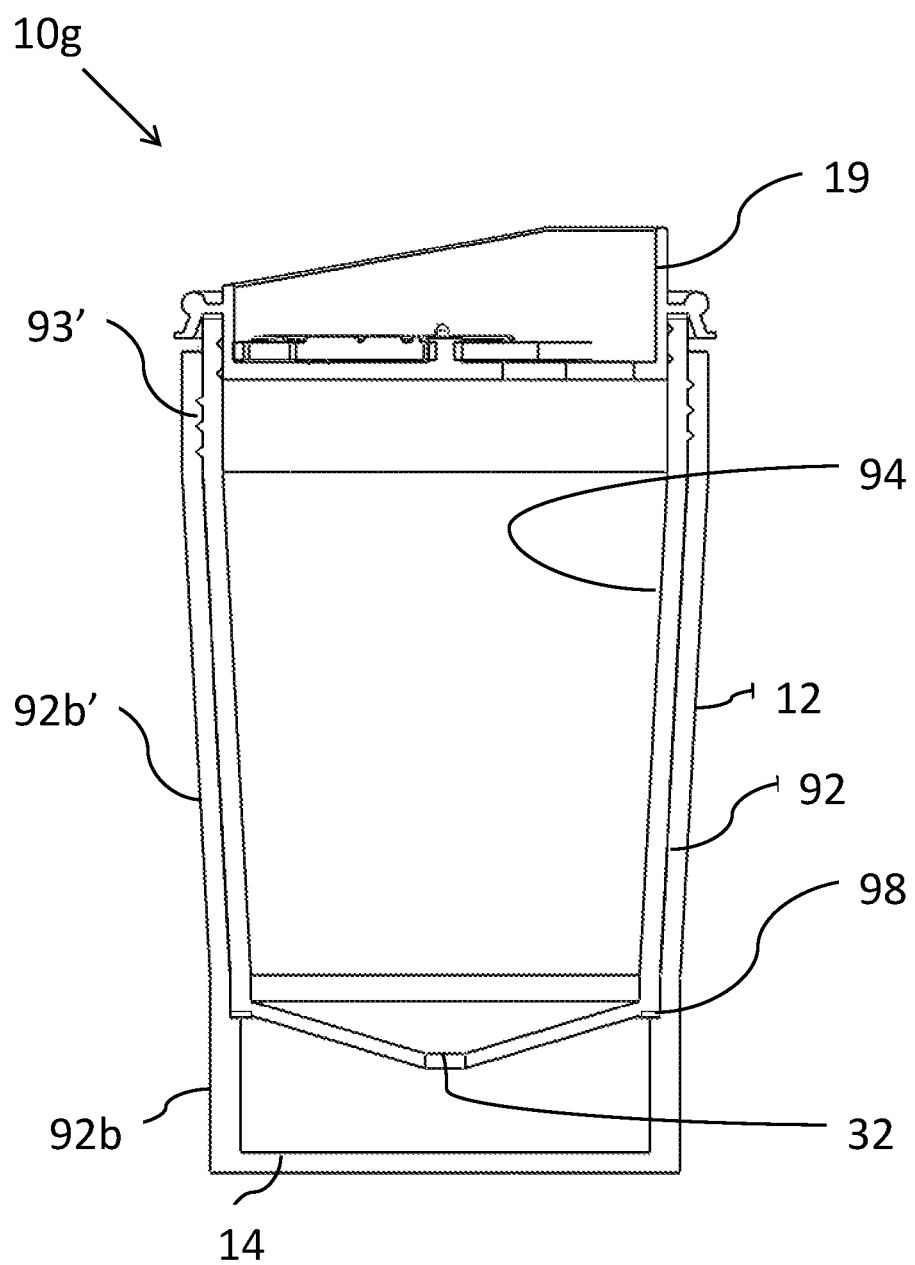
FIG. 18 is a somewhat schematic longitudinal sectioned view of a further embodiment of a steeping apparatus in accordance with an aspect of the invention.
Figure 19:
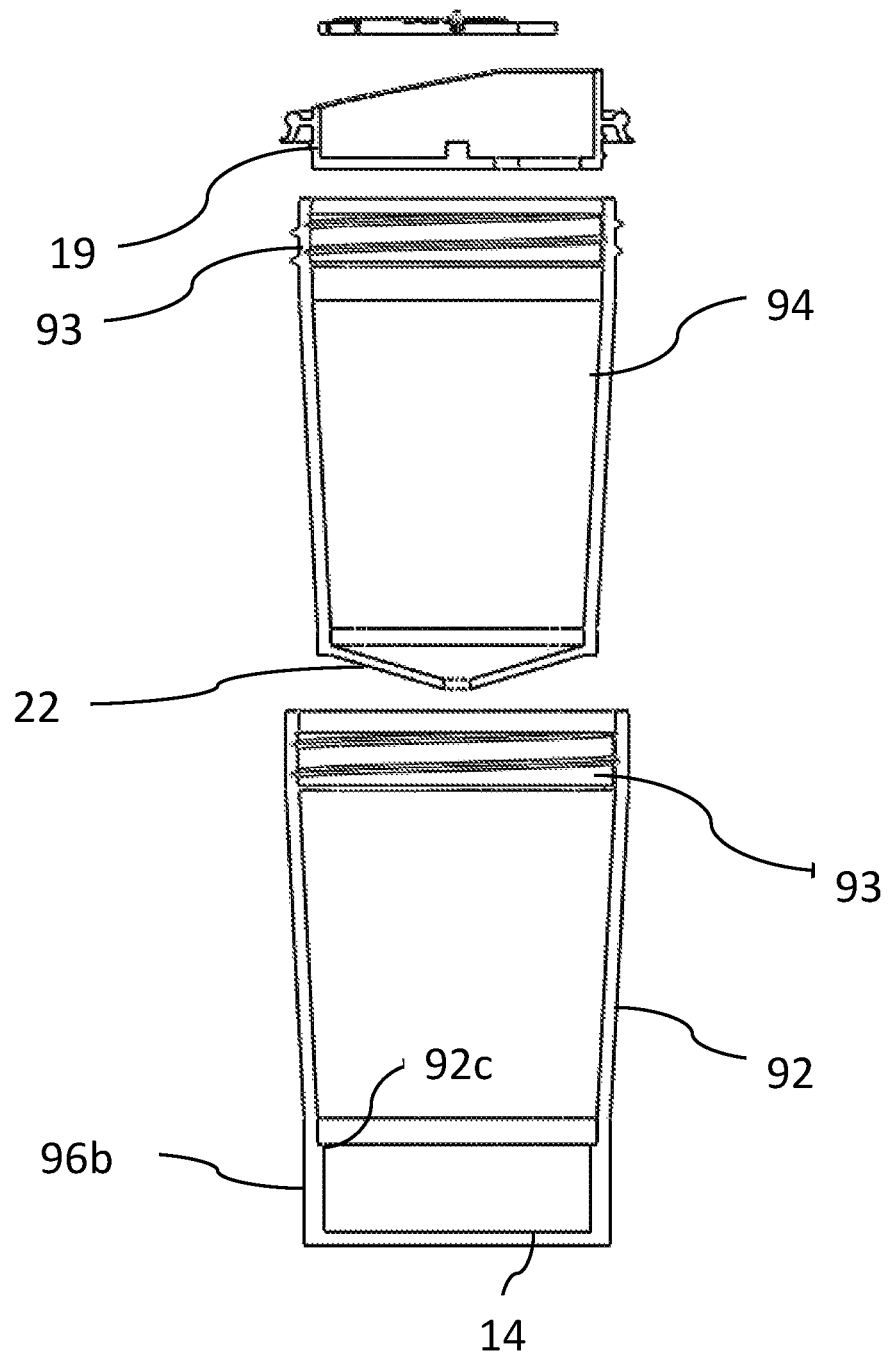
FIG. 19 is an exploded longitudinal sectioned view of the steeping apparatus of FIG. 18.

In this embodiment, the upper and lower parts are connected together by a screw thread connection 93 located at the lower end of the upper part 94. FIGS. 18 and 19 illustrate a modified apparatus 10g in which the upper and lower parts 92, 94 are connected together by a screw thread 93' located at upper end regions of the upper and lower parts 92, 94. In this embodiment, the lower edge of the upper part 94 sits on a ledge 92c in the peripheral wall 92b of the lower part 92, with a seal washer 98 in-between.

The partition 22 in the embodiments illustrated in FIGS. 10 to 19 is in the form of a conical funnel having a central region located below the outer periphery of the partition and a central aperture 32. However, other partition shapes as discussed above could be adopted in any of these embodiments provided that a volume of air is trapped within the lower chamber 26 when the container is filled with water.

The container 12 in the embodiments illustrated in FIGS. 11 to 19 can be made of any suitable materials such as glass, metal, ceramics, polymeric materials, paper, Polystyrene, and combinations thereof. However, since these embodiments are intended for multiple uses, it is expected that more robust materials such as glass, metal, ceramics, and polymeric materials would generally be used. In a particularly convenient arrangement, the upper and lower parts of the container may be moulded from polymeric materials.

The reusable cups in the embodiments illustrated in FIGS. 12 to 19 all incorporate a modified lid 19. An embodiment of the modified lid 19 is illustrated in more detail in FIGS. 20a to 20d.

Figure 20A:
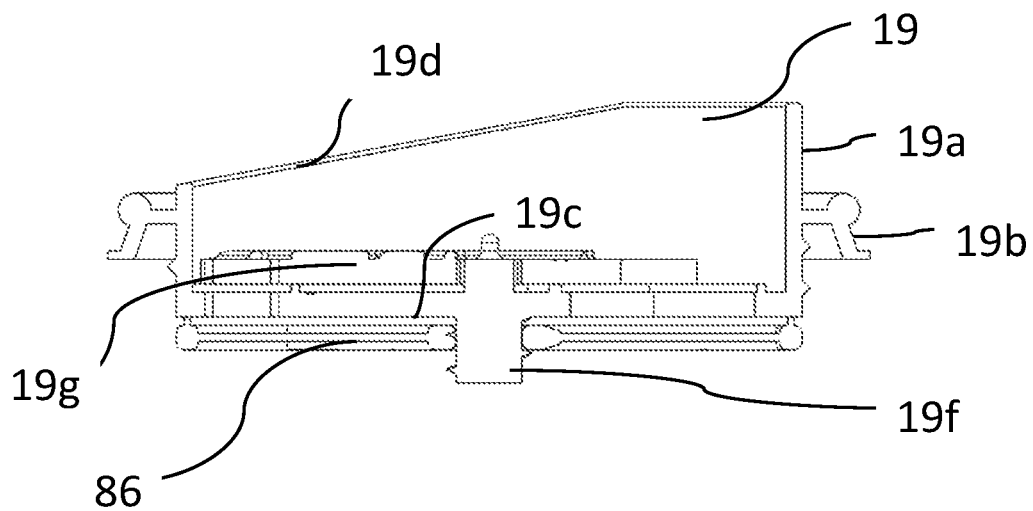
FIG. 20a is a sectional view through an embodiment of a lid forming pat of the apparatus of any of FIGS. 12 to 18.
Figure 20B:
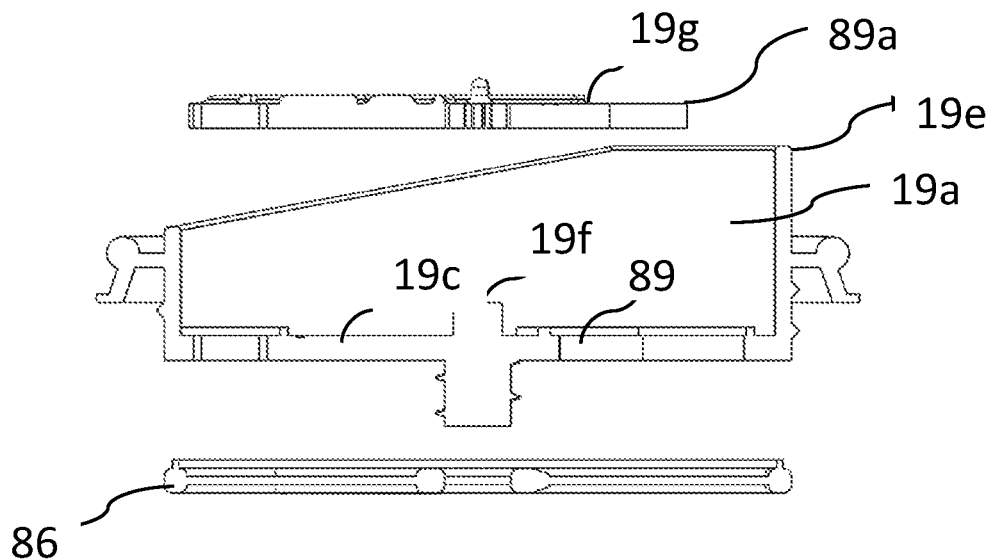
Figure 20C:
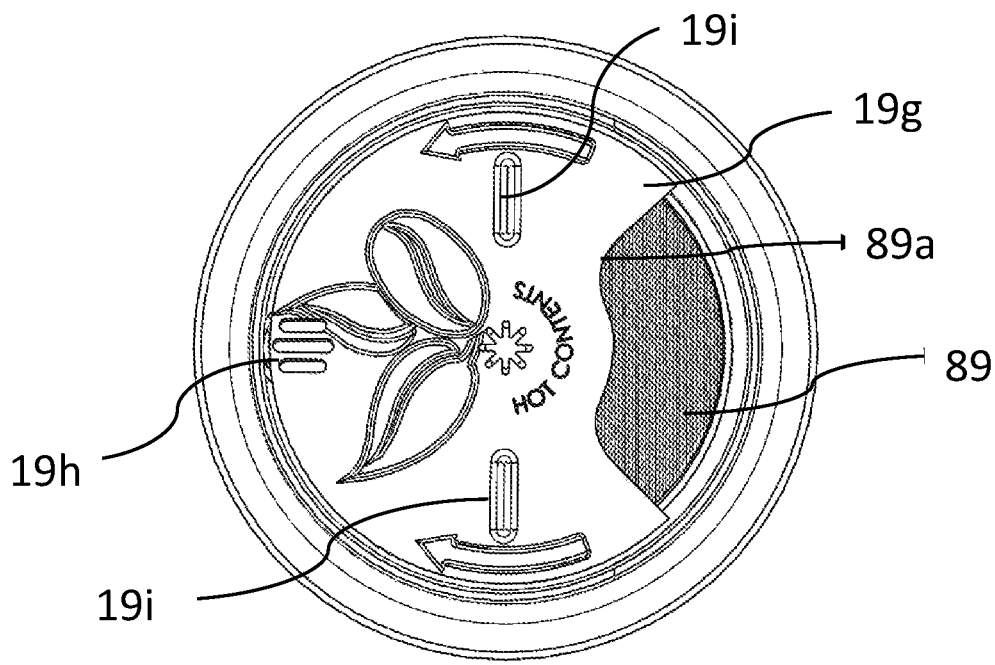
FIG. 20c is a view from above of the lid of FIGS. 20a and 20b.
Figure 20D:
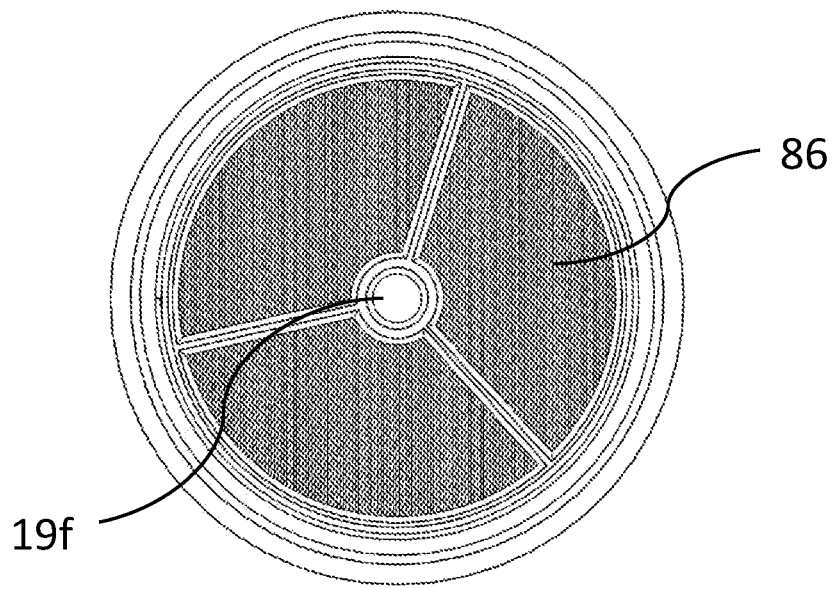
FIG. 20d is a view from below of the lid of FIGS. 20a and 20b.

The modified lid 19 has a main body portion 19a which is mounted to the upper end of the container 12 by a screw thread. The main body portion is circular having an outer edge on which the screw thread is formed for engagement with a corresponding screw thread on the inner surface of the container 12 at its upper end. A radially extending flange portion 19b projects outwardly from the peripheral edge to locate over the upper edge of the container 12 in use. The main body portion 19a has a sheet-like central portion 19c that extends across the upper end of the container. A primary dispensing opening 89 is defined in the sheet-like portion on one side. An upwardly projecting lip 19d extends circumferentially about the periphery of the main body of the lid on its upper/outer side. The lip 19d has a region 19e of increased height located about the dispensing opening 89 to form a drinking spout. The main body portion has a central spigot 19f which projects above and below the sheet-like central portion. A disc shaped filter 86 is removably mounted to the spigot 19f below the sheet-like member by means of a screw thread or push fit. The filter prevents brewing material passing through the primary dispensing opening 89 in use. A closure member 19g is rotatably mounted to the central spigot 19f above the sheet-like central portion. The closure member 19g is disc shaped and covers the upper surface of the sheet-like member of the main body portion. The closure member 19g defines a secondary dispensing opening 89a which in a first rotary position of the closure member as shown in FIG. 20c aligns with the primary dispensing opening 89 in the main body portion so that a user can drink from the cup. The closure member 19g also defines one or more cooling vents 19h on the side diametrically opposite the secondary dispensing opening 89a. A pair of lugs 19i are provided on the upper surface of the closure member which can be used to rotate the closure member. The closure member can be rotated through 90 degrees in either direction from the position shown in FIG. 20c to a fully closed position. In this position, both the secondary dispensing opening 89a and the cooling vents 19h are positioned above closed sections of the sheet-like portion 19c of the main body so that the primary dispensing opening 89 is fully closed by the closure member. Alternatively, the closure member 19g can be rotated through 180 degrees from the position shown in FIG. 20c to align the cooling vents 19h with the primary dispensing opening 89. In this position, the primary dispensing opening 89 is partially closed to prevent major spillage but to allow cooling of the beverage through the vents 19h. The filter 86 and the closure member 19b can be easily disassembled from the main body 19a for cleaning.

Figure 21A:
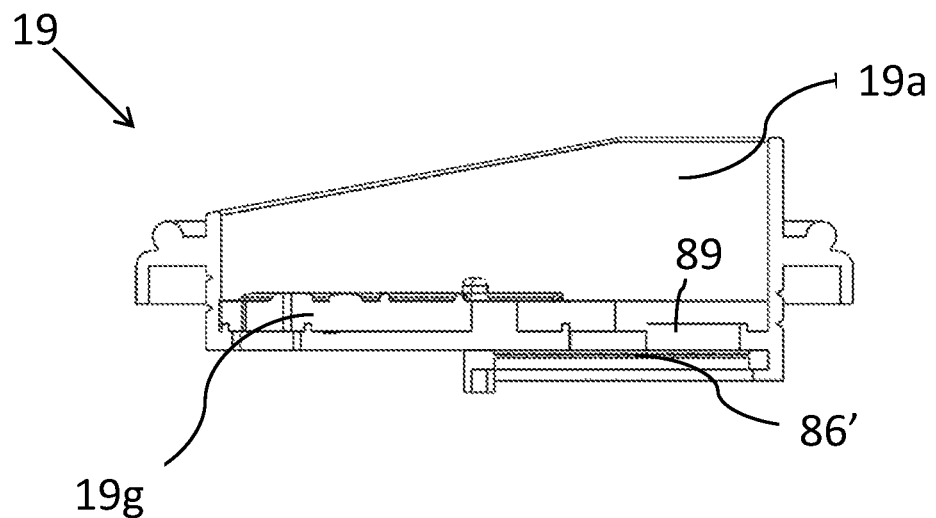
FIGS. 21a and 21b are views similar to that of FIGS. 20a and 20b but showing a modified embodiment of the lid.
Figure 21B:
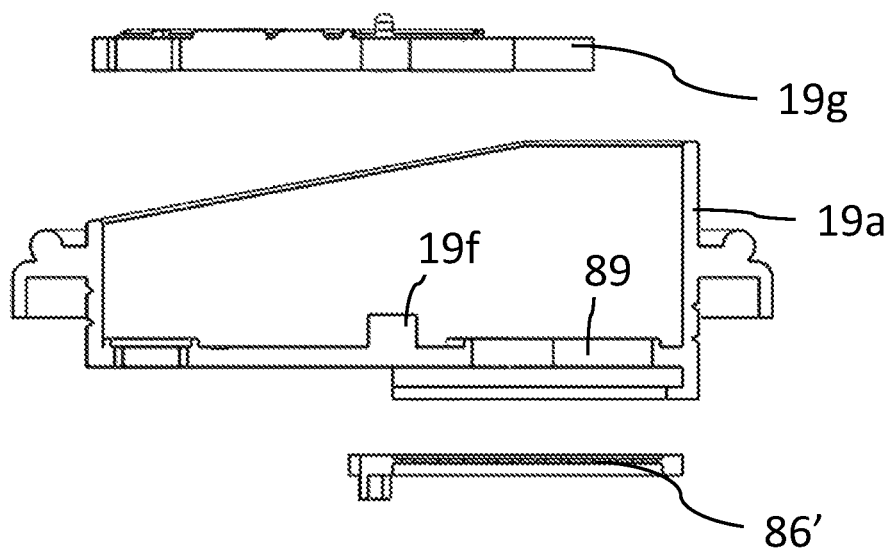
Figure 22A:
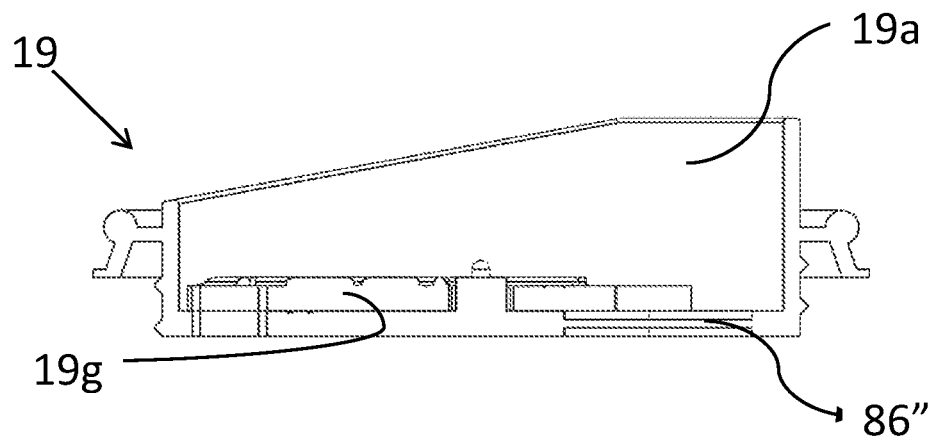
FIGS. 22a and 22b are views similar to that of FIGS. 20a and 20d but showing a further modified embodiment of the lid.
Figure 22B:
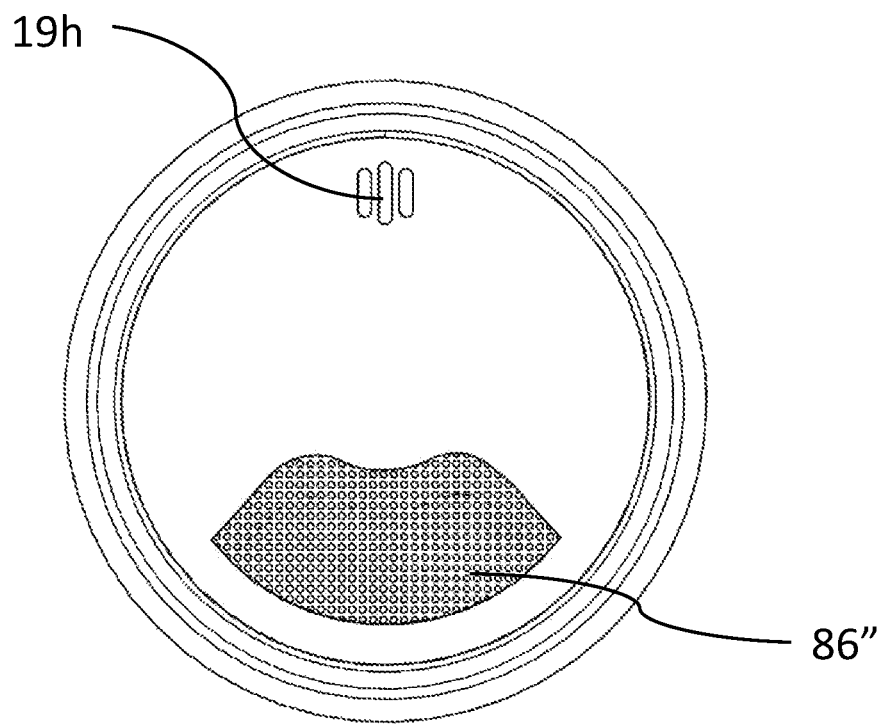

In this embodiment, the disc shaped filter 88 covers the whole of the lower surface of the sheet-like central portion 19c of the main body. However, as illustrated in FIGS. 21a and 21b a smaller filter 86' can be used which only covers the primary dispensing opening 89. The filer 86' in this case is a separate filter mesh mounted to the main body. The filter mesh can be a sliding fit to the main portion of the lid. As a further alternative illustrated in FIGS. 22a and 22b, a filter 86" can be formed integrally as part of the main body. In this embodiment, the filter 86" is formed by means of perforated plate-like member extending across the primary dispensing opening.

The modified lids 19 as shown in FIGS. 20a to 22b and as described above can be adopted for use with other embodiments of the apparatus described herein as appropriate. The modified lids could be adapted to be a press-fit on the container 12 rather than a screw fit.

Figure 23:
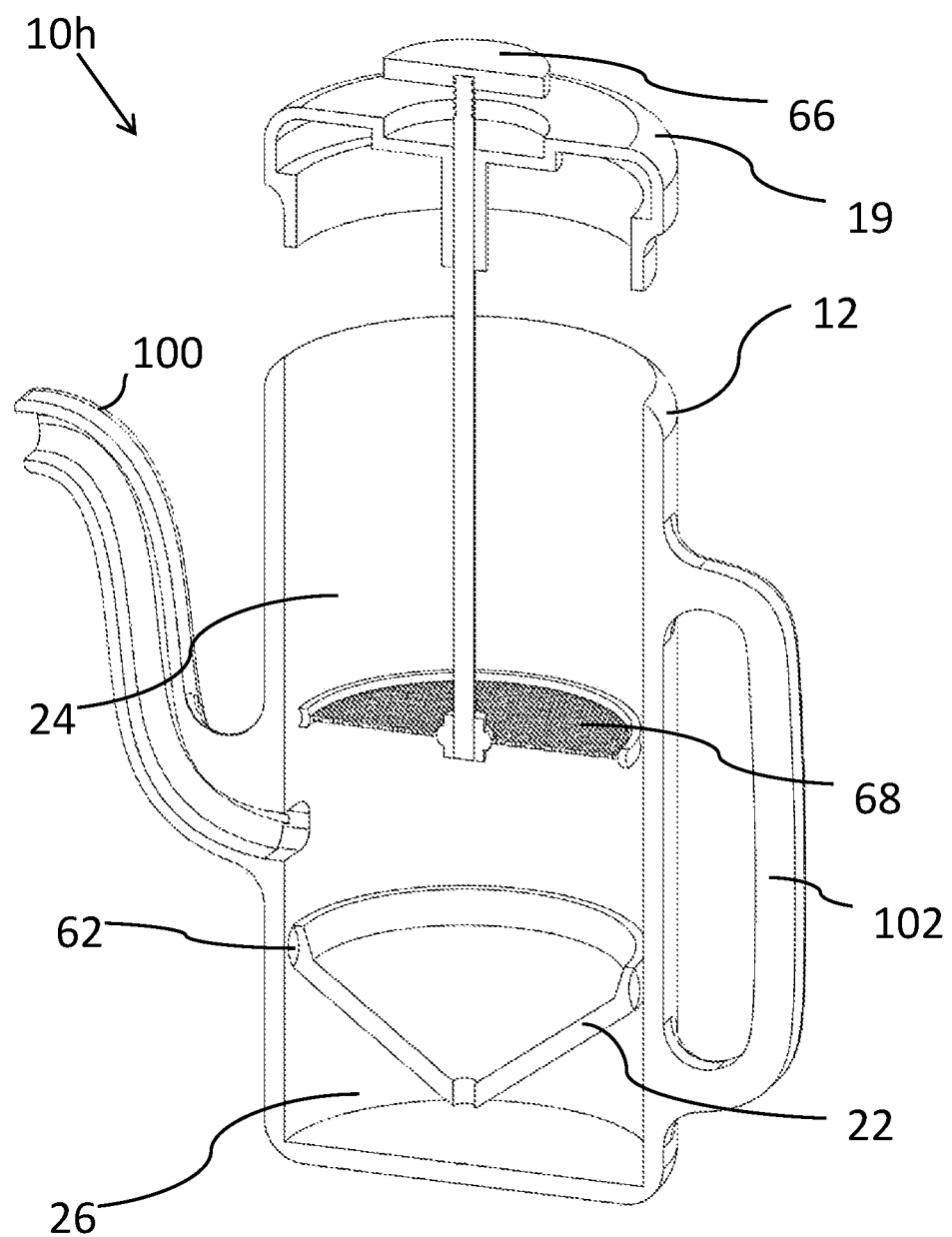
FIG. 23 is a somewhat schematic longitudinal sectioned perspective view of a still further embodiment of a steeping apparatus in accordance with an aspect of the invention.

FIG. 23 illustrates an embodiment of apparatus 10h in accordance with an aspect of the invention configured as a coffee pot or teapot. The container has a poring spout 100 which opens into the upper chamber and the container has a handle 102 to assist in pouring the brewed beverage. This embodiment incorporates a French press type filter plunger 66 but in an alternative arrangement, a fixed filter could be provided, say across the entrance to the spout 100 from the upper chamber.

Figure 24:
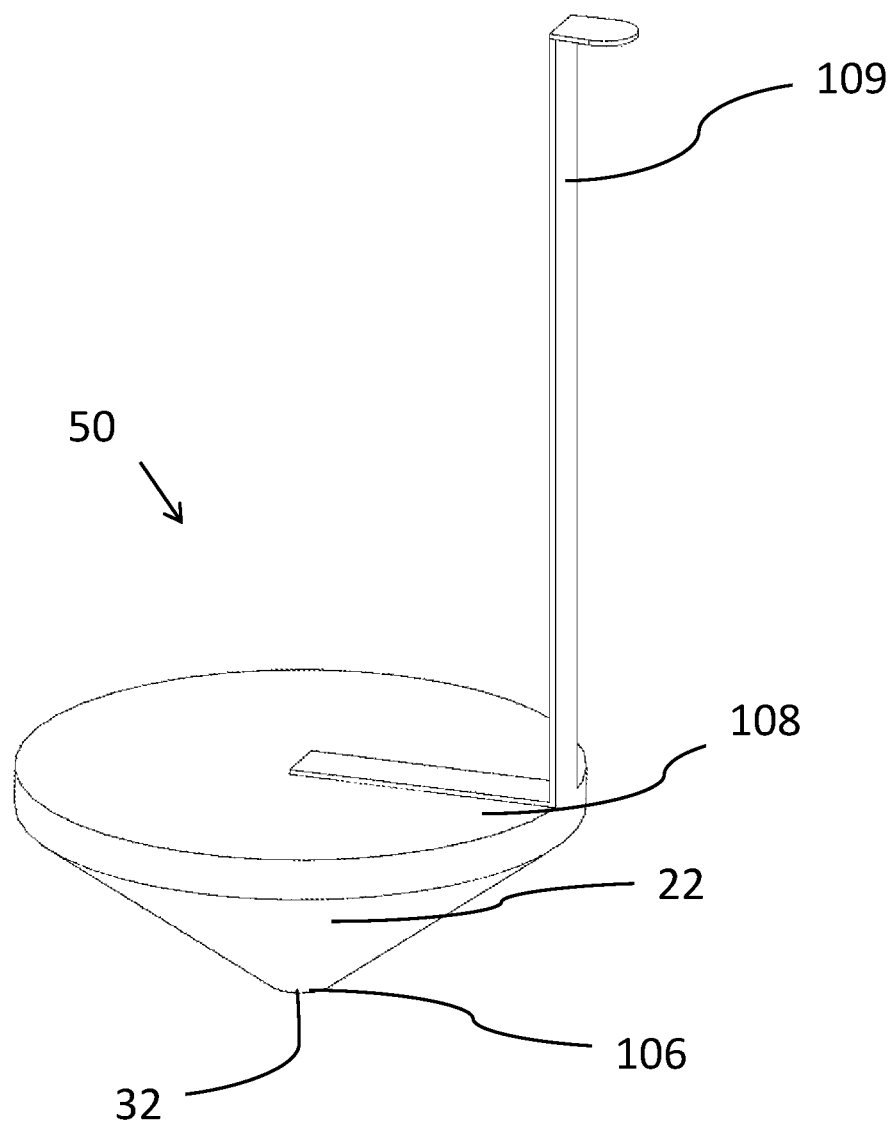
FIG. 24 is a perspective view of a partition unit forming part of an embodiment of a steeping apparatus in accordance with an aspect of the invention; and, FIGS. 25 to 29 are somewhat schematic longitudinal sectioned views respectively of further embodiments of a steeping apparatus in accordance with an aspect of the invention.
Figure 25:
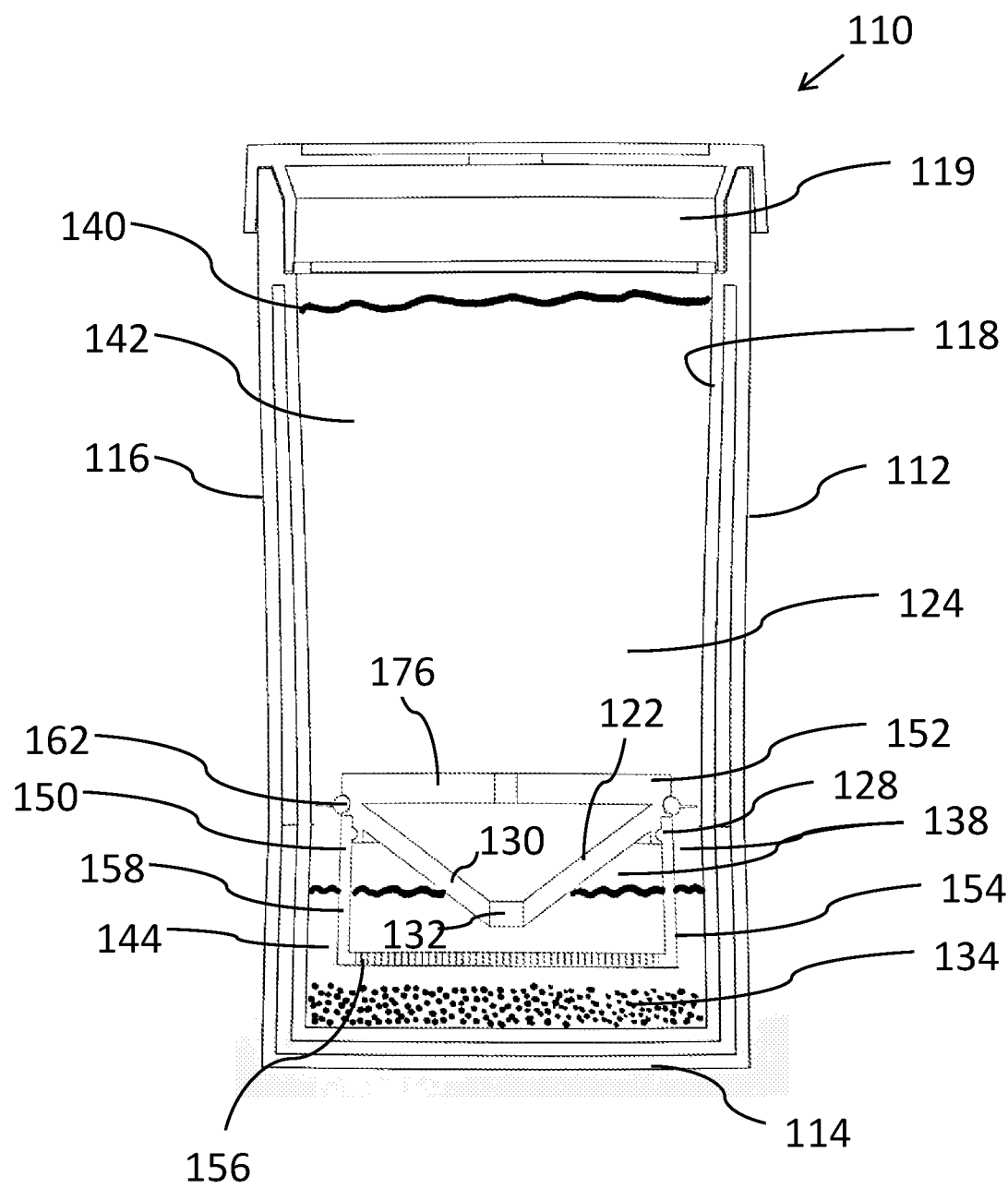

FIG. 24 illustrates an alternative embodiment of a partition unit 50 for using in an apparatus in accordance with an aspect of the invention. In this embodiment, the central aperture 32 is initially sealed by a membrane 106 made of a material which is dissolvable in hot water. This would help retain the coffee grounds 34 in the upper chamber initially until hot water is added so that the coffee grounds are suspended in the water before the membrane dissolves and water enters the lower chamber. The partition unit 50 could be supplied pre-filled with coffee grounds 34. To form a sealed unit, the upper end of the partition 22 can also be also closed by means of a water soluble membrane 108 with the coffee grounds inside the sealed partition. Similar water soluble membranes can be incorporated in other embodiments of the apparatus described herein as appropriate, either in combination or separately. FIG. 25 also illustrates an alternative handle 109 attached to the upper membrane to help in locating the unit in the container. This concept can be adapted for use with other types of brewing material provided the membranes are soluble in the liquid to be used for steeping.

In the embodiments so far described, the partition 22 is either fixedly located in the container (at least when assembled if the container is in two parts) or is statically positioned in the container at a fixed or predetermined height above the base before liquid is introduced into the container. FIGS. 26 to 30 illustrate alternative embodiments of apparatus and methods in accordance with aspects of the invention in which the partition is introduced into the container after steeping has been completed. In these embodiments, features which are the same, or which have broadly the same function, as those described above in relation to the previous embodiments are given the same reference numerals but increased by 100.

The apparatus 110 as illustrated in FIG. 25 comprises a container 112 having a base 114 and an upstanding peripheral wall 116 which define an internal volume 118 for holding a liquid. The container 112 is open at its upper end and has a removable lid 119. The container 112 and lid can be constructed in a similar manner to the containers 12 and lids 19 in the previously described embodiments, to which the reader should refer, and accordingly will not be described in further detail here.

The partition 122 is provided as part of a partition unit 150 which is slidably inserted into the interior volume of the container 112. The partition unit 150 is an assembly that includes an upper portion 152 which incorporates the partition 122 and a lower portion 154 which includes a perforated second base 156 and an upstanding peripheral wall 158. The upper portion 152 and the lower portion 154 are seperable and mounted together by means of a press fit, though they could be assembled by means of a screw connection or any other suitable method.

The partition 122 is substantially conical or funnel shaped having a central region 130 below its outer periphery 128. A cross member 176 extends across an upper end of the partition 122 connected at either end to a peripheral region of the partition. The partition has a single first aperture 132 at is centre. The peripheral wall 158 of the lower portion 152 extends between an outer edge of the base 156 and the periphery 128 of the partition 122 so that at a volume below the partition 122 surrounding the central aperture 132 below the partition is enclosed by the wall 158 and the base 156. A seal 162 is mounted about the periphery 128 of the partition. The seal 162 engages the wall 116 of the container when the partition unit 150 is inserted into the interior volume of the container 112 to form a fluid-tight seal between with the wall 116 of the container.

In use, with the lid 119 and partition unit 150 removed from the container, coffee is brewed in the container by introducing coffee grounds 134 and hot water into the interior volume 118. The interior volume is filled up to a maximum intended fill level 140. This may be marked on the container as a guide to assist a user and other, lower fill levels may also be marked.

Once the coffee grounds 134 have steeped for a sufficiently long time to brew a desired coffee, the partition unit 150 is lowered down through the interior volume of the container. As the partition unit is introduced into the interior volume, the seal 162 engages the wall 116 of the container above the maximum intend fill level 140 so that a volume of air 138 is trapped below the seal and the partition 122. The seal 162 may have an outer diameter that is larger than the opening of the interior volume to ensure that at least some air is trapped below the seal and the partition 122 as the partition unit 150 is introduced. As the partition unit 150 is lowered, liquid below the partition is able to move above the partition 122 by flowing through the aperture 132. However, to reach the aperture 132 the liquid must first pass through the perforated base 158 which acts to filter out substantially all of the coffee grounds 134 so that liquid in the upper chamber above the partition comprises brewed coffee 142 which is substantially free of coffee grounds. The air 138 which is trapped below the seal 162 is unable to escape so long as the seal is maintained and so is drawn down the container as the partition 122 is lowered, becoming slightly compressed in process.

Once the partition unit 150 has been fully lowered, as shown, all or the majority of the coffee grounds 134 are contained in the lower chamber 126 below the partition 122 and so are isolated from the coffee 142 above the partition. As with the previous embodiments, the air 138 trapped in the lower chamber 126 below the partition 122 applies a force to the liquid 144 in the lower chamber which prevents the bodies of liquid 142, 144 in the two chambers from mixing through the central aperture 132, thus substantially decoupling the brewed coffee 142 in the upper chamber 124 from the liquid 144 in the lower chamber 126.

The partition unit 150 could be attached to the end of a plunger slidably mounted in an aperture in the lid 119 so that the partition unit 150 can be introduced into the container and lowered in a manner similar to that of the filter assembly in a French press. However, other arrangements can be adopted to enable a user to manoeuvre the partition unit 150. Furthermore, it should be appreciated that the partition 122 need not be provided as part of a partition unit 150 as illustrated but could take other forms. In one possible example, a filter can be provided across the aperture 132 to eliminate the need for the lower portion 154 of the partition unit.

In this and subsequent embodiments, some or all of the coffee grounds 134 are captured in the lower chamber 126 as the partition unit 150 is lowered rather than relying on them sinking down into the lower chamber through the central aperture 32 in the partition 22.

Figure 26:
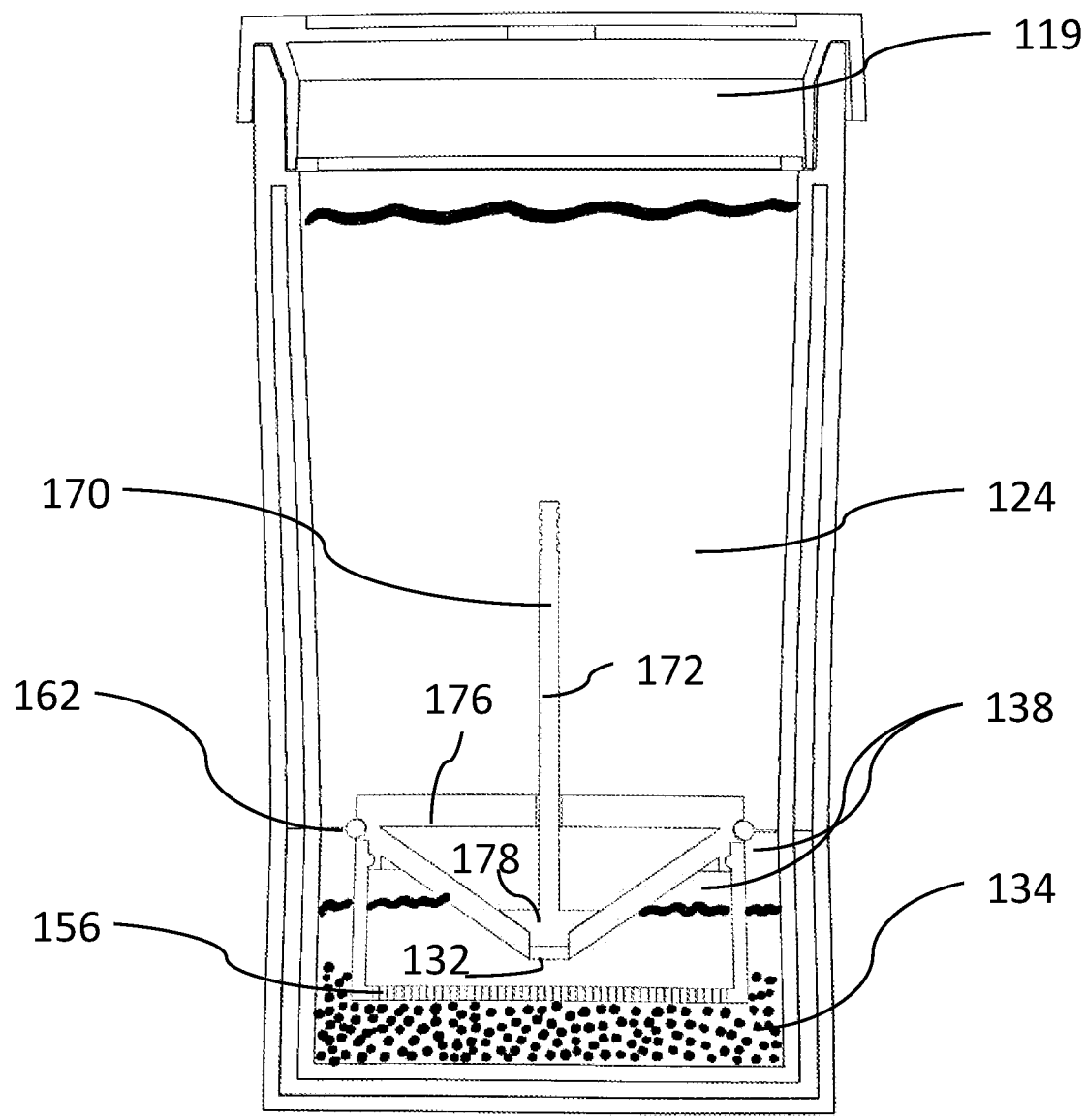

FIG. 26 illustrates how the embodiment of FIG. 25 can be further modified to incorporate a plug mechanism 170 similar to that described above in relation to FIGS. 3 to 6 to physically close the central aperture 132 after the partition unit 150 has been lowered to the bottom of the container. The plug mechanism comprises a rod 172 slidably mounted in an aperture in cross member 176 and head 178 on the lower end of the rod for insertion into the aperture 132. The apparatus can include a plunger arrangement similar to the plunger 66 in the earlier embodiment which is depressed to lower the rod and engage the head in the aperture 132. The plunger 66 could be a telescopic or otherwise compressible in length so that it is initially depressed to lower the partition unit 150 until the unit reaches the bottom of the container and then compresses in length to lower the rod to close off the aperture 132.

Figure 27:
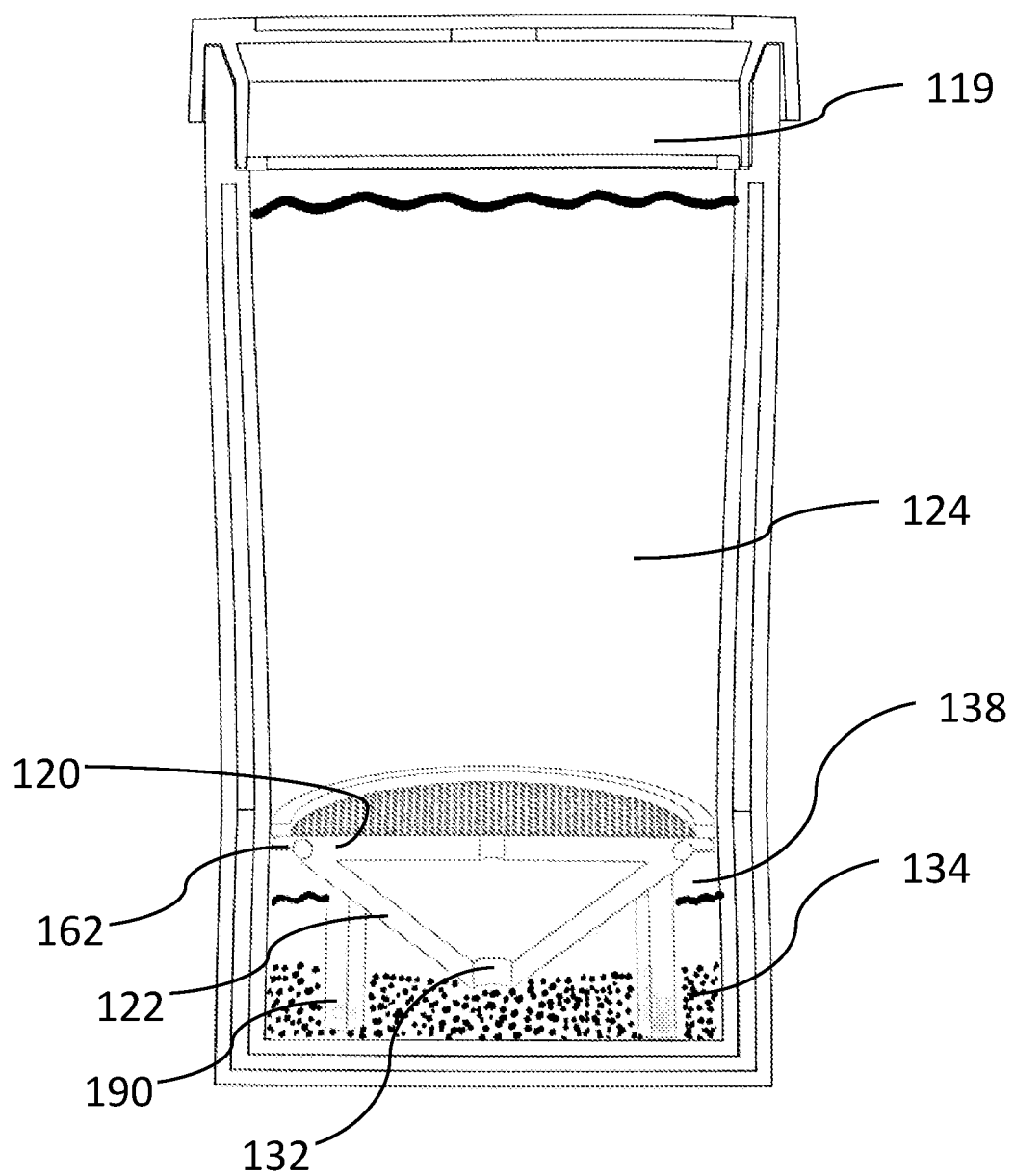

FIG. 27 illustrates a modification in which a filter 120 is mounted across the upper end of the partition 122. In this embodiment, the partition has downwardly depending legs 190 which support the partition on the base 114 of the container when it is fully lowered. In this arrangement, the filter 120 will retain any coffee grounds 134 which pass through the aperture 132 as the partition is lowered within the volume defined by the upper surface of the conical partition and the filter. From here, the majority of the coffee grounds will sink back through the aperture 132 into the lower chamber where they are decoupled from the coffee in the upper chamber. Whilst some coffee grounds 134 may remain above the aperture 132, these will be relatively few and so are unlikely to significantly affect the taste of coffee 142.

Figure 28:
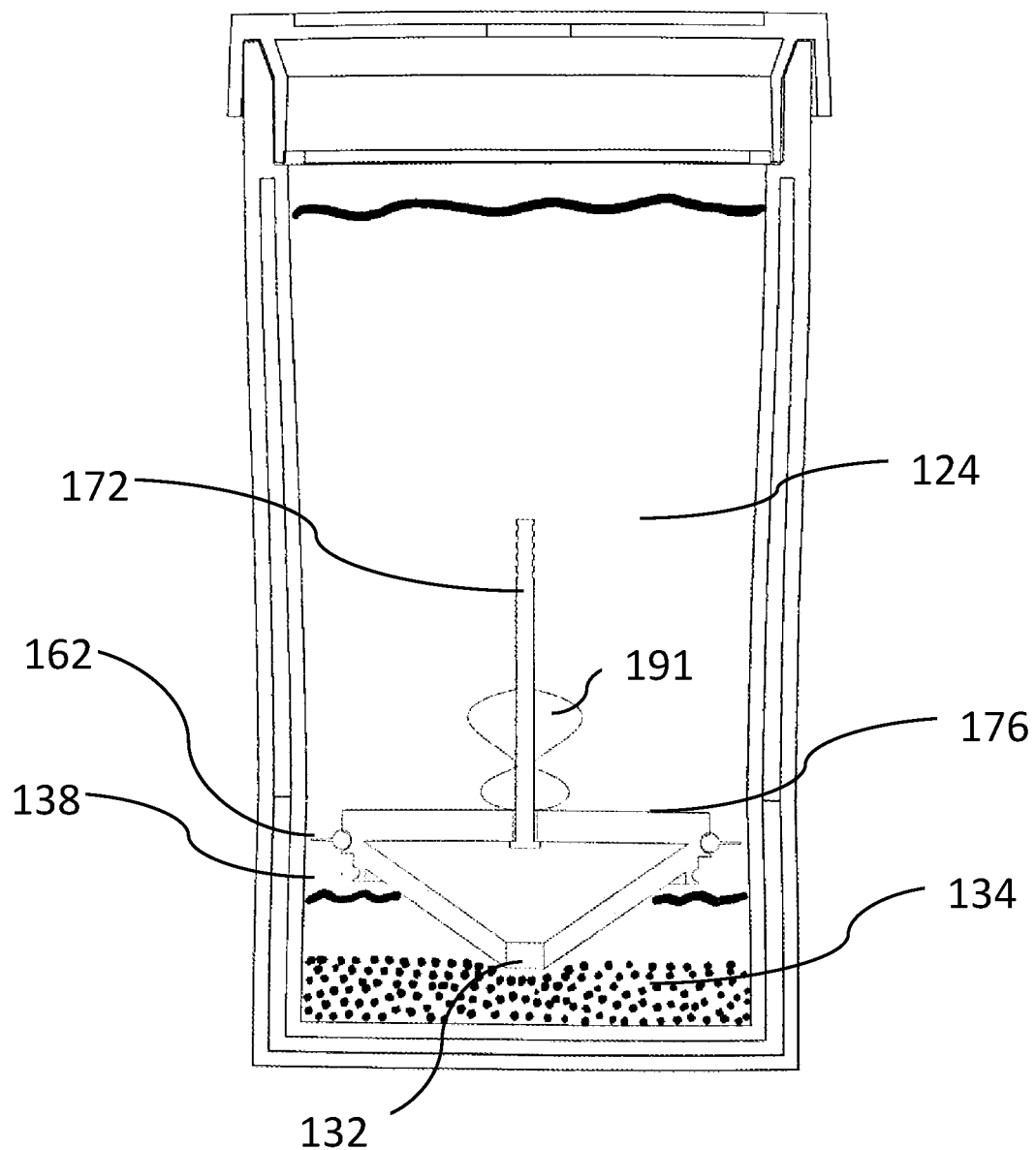

FIG. 28 illustrates how paddles or other stirring features 191 can be added to a rod 172 mounted the partition 122 and which can be used to sir the coffee 142 in the upper chamber by rotating the rod.

Figure 29:
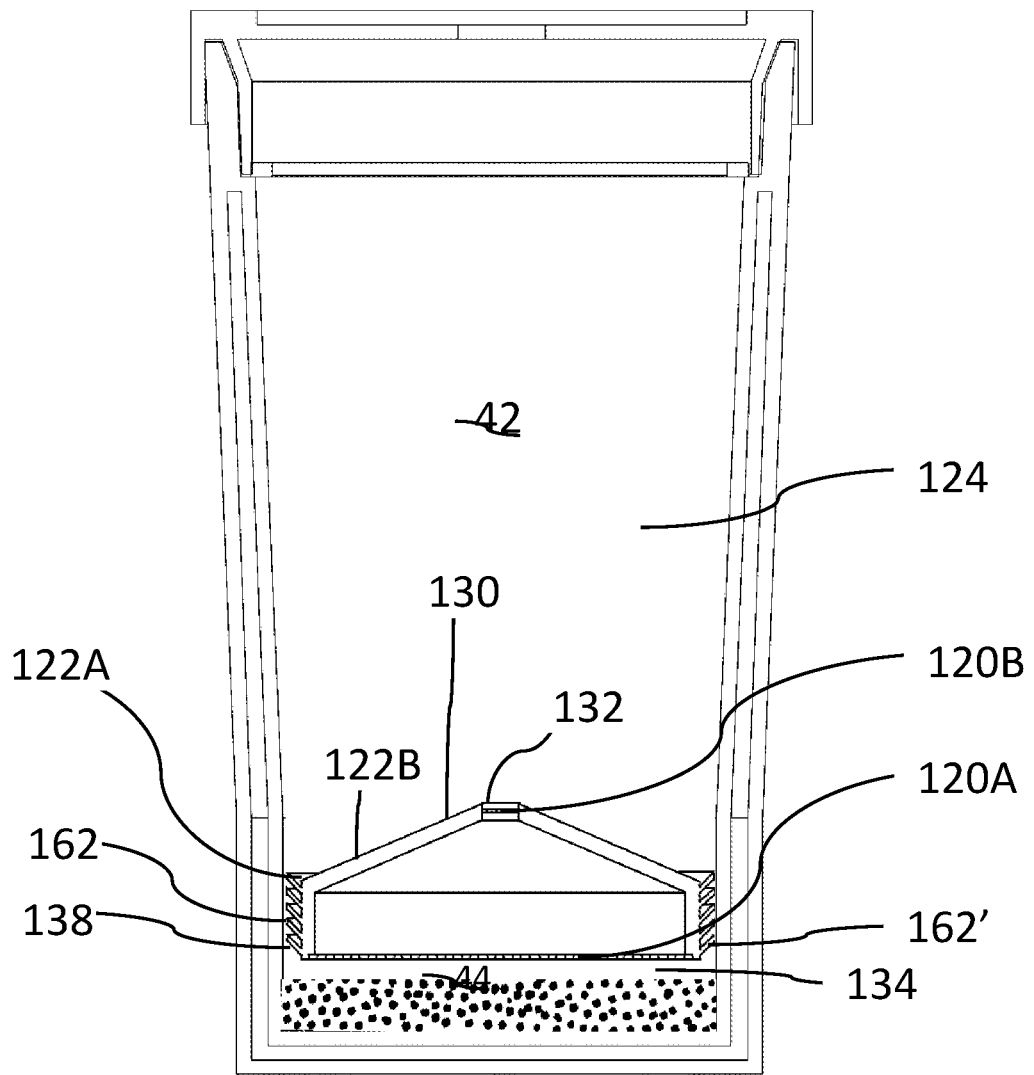

FIG. 29 illustrates an embodiment in which the partition 122 is convex, its central region 130 being higher than its periphery 128 where it makes sealing contact with the wall 116 of the container. In this embodiment, the partition 122 has an upright peripheral wall portion 122A and a convex conical portion 122B extending upwardly from an upper end of the upright wall portion 122A. A central aperture 132 is located at the apex of the conical portion. A first filter 120A extends across the lower end of the upright wall portion 122A whilst a second filter 120B extends across the aperture 132. A number of seals 162 are located about the outer surface of the upright wall portion 122A and which seals engage with the wall of the container in an airtight manner. In this embodiment, a relatively small volume of air 138 is trapped in the lower chamber between the lowermost seal 162' and a lower edge of the upright wall 122A of the partition, which is just below the level of the lower seal 116'. Whilst the volume of air is relatively small, it is sufficient to apply a force to the liquid in the lower chamber 126 to prevent movement of liquid between the upper and lower chambers. As with the embodiment shown in FIG. 27, the filters 120A, 120B prevent coffee grounds from passing through the central aperture 132 to enter the upper chamber 124 as the partition is lowered through the steeping coffee.

The above embodiments are described by way of example only. Many variations are possible without departing from the scope of the invention as defined in the appended claims. For example, whilst the apparatus has been described primarily for use in brewing hot beverages using hot water and a brewing material, such as coffee grounds or tea leaves, the apparatus can be adapted for use in brewing a cold beverage using cold water or indeed steeping a variety of solid food materials in different liquids to produce a flavoured liquid for consumption. Accordingly, references in the description to hot water can be replaced by references to cold water and other consumable liquids as appropriate and references to coffee grounds can be replaced by reference to brewing materials generally.

The invention claimed is:

1. A steeping apparatus for brewing a beverage from a brewing material, the apparatus comprising:
   a container having a base and a wall extending upwardly from the base to define an internal volume; and
   a partition which, at least in use, is statically mounted in the container at a set distance above the base to divide the internal volume into an upper chamber above the partition for holding a brewed beverage and a lower chamber below the partition, for receiving brewing material from the upper chamber, the upper chamber having a larger volume than the lower chamber,
   the partition having a peripheral region sealingly associated with the wall and a central region having at least one first aperture for fluidly interconnecting the upper and lower chambers, the partition outside the central region being substantially impervious to air,
   wherein the container defines an inlet for introducing a liquid into the internal volume, the inlet opening into the upper chamber, configured such that in use the container is fillable with a liquid to a level above the partition with the liquid entering the lower chamber through said at least one first opening to partially fill the lower chamber, a volume of air being trapped in the lower chamber in a region located laterally outside the central region of the partition as the container fills with liquid to said level, and such that the at least one first aperture defines a part of a flow path along which brewing material held in suspension in liquid in the upper chamber is able to move from the upper chamber into the lower chamber in use.

2. Apparatus as claimed in claim 1, wherein the partition is attached to the container at a fixed position.

3. Apparatus as claimed in claim 1, wherein the partition is formed integrally with the container.

4. Apparatus as claimed in claim 1, wherein the partition is provided as part of a partition unit locatable in the internal volume at a set position above the base.

5. Apparatus as claimed in claim 4, wherein the partition unit includes a peripheral seal for engagement with the wall of the container.

6. Apparatus as claimed in claim 1, wherein the partition is concave, the central region of the partition being located below the peripheral region of the partition.

7. Apparatus as claimed in claim 6, wherein the partition is tapered becoming narrower towards the central region.

8. Apparatus a claimed in claim 6, wherein the partition is in the form of a funnel.

9. Apparatus as claimed in claim 6, wherein the partition has the shape of a frustum of a cone or pyramid.

10. Apparatus as claimed in claim 1, wherein the partition has a single, centrally located first aperture.

11. Apparatus as claimed in claim 1, wherein the container comprises two releasably connected parts, a lower part which defines the base and at least part of the wall and an upper part which defines at least a further part of the wall.

12. Apparatus as claimed in claim 11, wherein the two parts of the container are releasable connected by means of a screw threaded connection.

13. Apparatus as claimed in claim 11, wherein the lower part comprises the base and a first wall portion extending upwardly from the base, the partition being releasably mounted to the first wall portion.

14. Apparatus as claimed in claim 11, wherein the partition is mounted to the upper part of the container.

15. Apparatus as claimed in claim 11, wherein the partition is integrally formed with the upper part of the container.

16. Apparatus as claimed in claim 14, wherein the lower part of the container comprises the base and a first wall portion extending upwardly from the base and the upper part of the container comprises a second wall portion, the first and second wall portions together defining the wall of the container when the parts are assembled, and wherein an upper region of the first wall portion of the lower part overlaps the second wall portion of the upper part of the container.

17. A method of brewing a beverage using an apparatus as defined in claim 1, the method comprising:
    introducing a liquid into the upper chamber such that some of the liquid passes through the at least one first aperture to partially fill the lower chamber; and
    continuing to introduce said liquid until the upper chamber is filled to a desired level,
    wherein a volume of air is trapped in the lower chamber.

18. A method as claimed in claim 17, wherein a brewing material is present in the upper chamber such that at least some of the brewing material is brought into suspension in the liquid in the upper chamber, the method further comprising allowing the brewing material to steep in the upper chamber for a period of time, at least some of the brewing material sinking to the bottom of the upper chamber and passing through the at least one first aperture to enter the lower chamber.

19. A method of brewing a beverage using apparatus as claimed in claim 1, the method comprising:
    introducing a liquid into the upper chamber such that some of the liquid passes through the at least one first aperture to partially fill the lower chamber; and
    continuing to introduce said liquid until the upper chamber is filled to a desired level,
    wherein a volume of air is trapped in the lower chamber.

20. The method as claimed in claim 19, wherein a brewing material is present in the upper chamber such that at least some of the brewing material is brought into suspension in the liquid in the upper chamber, the method further comprising allowing the brewing material to steep in the upper chamber for a period of time, at least some of the brewing material sinking to the bottom of the upper chamber and passing through the at least one first aperture to enter the lower chamber.

21. Apparatus as claimed in claim 1, wherein the apparatus is a beverage cup.

22. Apparatus as claimed in claim 1, wherein the container defines an outlet for dispensing a brewed beverage from the upper chamber.

* * * * *